March 25, 1969   J. K. DAVIS ET AL   3,434,781
OPHTHALMIC LENS SERIES
Filed March 15, 1965   Sheet 1 of 11

INVENTORS
JOHN K. DAVIS
HENRY G. FERNALD
ARLINE W. RAYNER
BY Louis L. Gagnon
Robley J. Williams
ATTORNEYS

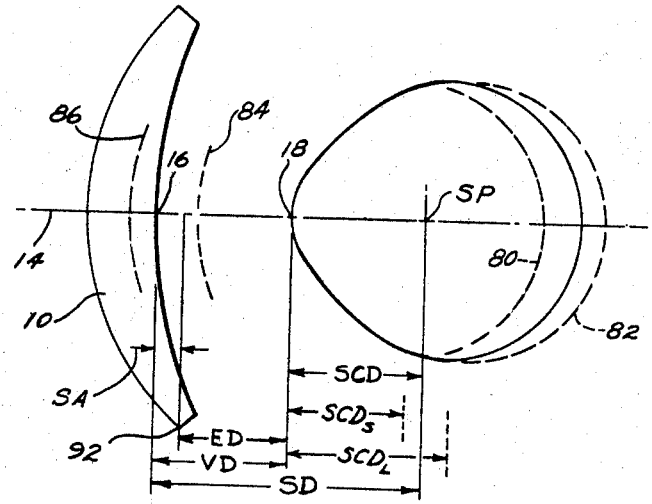
Fig. 13
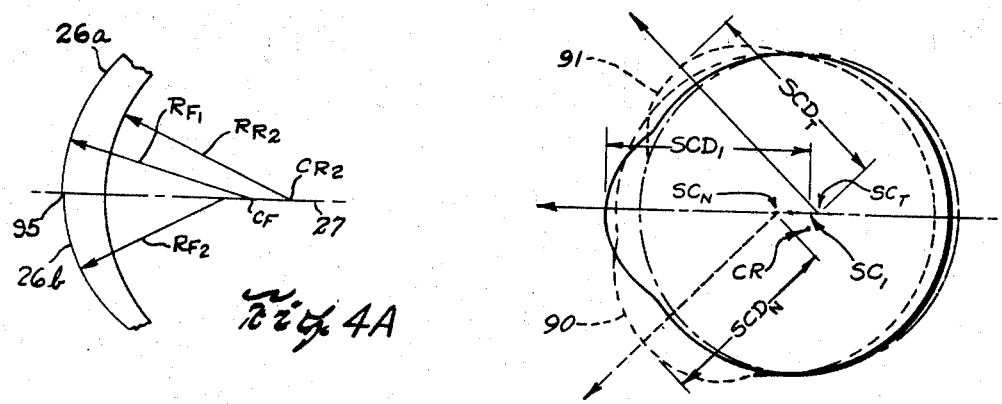
Fig. 4A
Fig. 15
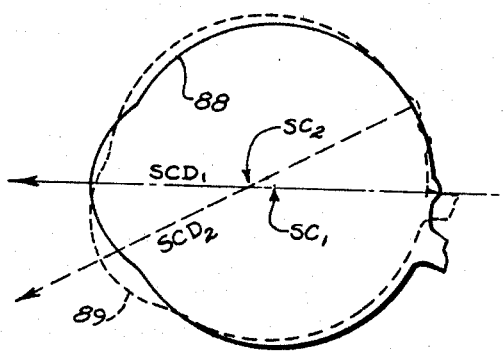
Fig. 14
INVENTORS
JOHN K. DAVIS
HENRY G. FERNALD
ARLINE W. RAYNER
BY
ATTORNEY

| GENERAL PURPOSE SERIES | | | | OBJ. DIST. ∞, 1.0.M., 0.3-0.4M | | | | | | | | | | | | | | | L.S. = DIST. S.S. = NEAR | |
|---|---|---|---|---|---|---|---|---|---|---|---|---|---|---|---|---|---|---|---|---|
| RX SPH | NFC | CLY.→ t | 0.00 1OBC | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 | t |
| +7.00 | | 6.1 | -4.00 | | | | | | | | | | | | | | | | | |
| +6.75 | 11.00 | 5.9 | -4.25 | | | | | | | | | | | | | | | | | 6.1 |
| +6.50 | | 5.7 | -4.50 | | | | | | | | | | | | | | | | | 5.9 |
| +6.25 | | 6.1 | -4.00 | | | | | | | | | | | | | | | | | 5.7 |
| +6.00 | 10.25 | 5.9 | -4.25 | | | | | | | | | | | | -4.75 | | | | | 5.5 |
| +5.75 | | 5.6 | -4.50 | | | | | | | | | | | | | | | | | 5.9 |
| +5.50 | | 5.4 | -4.00 | | | | | | | | | | | | | | | | | 5.6 |
| +5.25 | 9.50 | 5.2 | -4.25 | | | | | | | | | | | -4.75 | | | | | | 5.4 |
| +5.00 | | 5.0 | -4.50 | | | | | | | | | | | | | -5.00 | | | | 5.2 |
| +4.75 | | 4.7 | -4.00 | | | | | | | | | | | | | | | | | 5.0 |
| +4.50 | 8.75 | 4.5 | -4.25 | | | | | | | | | | | -4.75 | | | | | | 4.7 |
| +4.25 | | 4.3 | -4.50 | | | | | | | | | | | | | -5.00 | | | | 4.5 |
| +4.00 | | 4.6 | -4.00 | | | | | | | | | | | | | | | | -5.25 | 4.3 |
| +3.75 | 8.00 | 4.3 | -4.25 | | | | | | | | | | | | -4.75 | | | | | 4.1 |
| +3.50 | | 4.1 | -4.50 | | | | | | | | | | | | | | -5.00 | | | 3.9 |
| +3.25 | | 3.8 | -4.00 | | | | | | | | | | | | | | | | -5.25 | 3.7 |
| +3.00 | 7.25 | 3.6 | -4.25 | | | | | | | | | | | -4.75 | | | | | | 3.8 |
| +2.75 | | 3.4 | -4.50 | | | | | | | | | | | | | -5.00 | | | | 3.6 |
| +2.50 | | 3.3 | -4.75 | | | | | | | | | | | | | | | -5.25 | | 3.4 |
| +2.25 | | 3.2 | -4.00 | | | | | | | | | | | | | | | | | 3.3 |
| +2.00 | 6.25 | 3.1 | -4.25 | | | | | | | | | | | | -5.00 | | | | | 3.2 |
| +1.75 | | 2.9 | -4.50 | | | | | | | | | | | | | | -5.25 | | | 3.1 |
| +1.50 | | 2.8 | -4.75 | | | | | | | | | | | | | | | | -5.50 | 2.9 |
| +1.25 | | 2.7 | -4.25 | | | | -5.00 | | | | | | | | | | | | | 2.8 |
| +1.00 | | 2.6 | -4.50 | | | | | | -5.25 | | | | | | | | | | | 2.7 |
| +0.75 | | 2.4 | -4.25 | | | | | | | | | | | | | | | | | 2.6 |
| +0.50 | 5.50 | 2.3 | -5.00 | | | | | | | | | | | | -4.25 | | | | | 2.4 |
| +0.25 | | 2.2 | -5.25 | | | | | | | -4.50 | | | | | | | | | | 2.3 |
| 0.00 | | 2.1 | -5.50 | | | | | -4.75 | | | | | | | | | | | | 2.2 |
| -0.25 | | 2.0 | -5.75 | -5.00 | | | | | | | -4.50 | | | | -4.25 | | | | | 2.1 |
| -0.50 | | 1.8 | -5.25 | | | | | | | -4.75 | | | | | -4.25 | | | -4.00 | | 2.0 |
| -0.75 | | 1.7 | -5.50 | | | | | -5.00 | | | | | -4.50 | | -4.25 | | | -4.00 | | 1.8 |
| -1.00 | 4.75 | 1.6 | -5.75 | | | -5.00 | | | | -4.75 | | | | | -4.25 | | | -4.00 | | 1.7 |
| -1.25 | | 1.5 | -6.00 | | -5.50 | | | | -5.00 | | | | | -4.50 | | -4.25 | | | | 1.6 |
| -1.50 | | 1.4 | -6.25 | -5.25 | | | -5.25 | | | -4.75 | | | | -4.50 | | -4.25 | | -4.00 | | 1.5 |
| -1.75 | | 1.3 | -6.00 | | -5.50 | | | -5.00 | | | -5.00 | | -4.50 | | -4.25 | | | -4.00 | | 1.4 |
| -2.00 | | 1.2 | -6.25 | | -5.75 | | | | -5.25 | | | -4.75 | | -4.50 | | -4.25 | | -4.00 | | 1.3 |
| -2.25 | | 1.2 | -6.50 | -6.00 | | | -5.50 | | | -5.25 | | | | -4.75 | | -4.25 | | | | 1.2 |
| -2.50 | | 1.2 | -6.25 | | -5.75 | | | | -5.25 | | -5.00 | | -4.50 | | | | | | | 1.2 |
| -2.75 | 3.75 | 1.2 | -6.50 | | -6.00 | | | -5.50 | | | | -5.00 | -4.75 | | | | | | | 1.2 |
| -3.00 | | 1.2 | -6.75 | -6.25 | | -5.75 | | | | | -5.25 | | -5.00 | | | | | | | 1.2 |
| -3.25 | | 1.2 | -6.50 | | | -6.00 | | | -5.50 | | | -5.25 | | | | | | | | 1.2 |
| -3.50 | 3.25 | 1.2 | -6.75 | -6.25 | | | -5.75 | | | | | | | | | | -5.00 | | 1.2 |
| -3.75 | | 1.2 | -7.00 | -6.50 | | | | -6.00 | | | | | | | -5.25 | | | | 1.2 |
| -4.00 | | 1.2 | -6.75 | | | -6.25 | | | | | | | | | -5.50 | | | | | 1.2 |
| -4.25 | 2.75 | 1.2 | -7.00 | -6.50 | | | | | | | | | | -5.75 | | | | | | 1.2 |
| -4.50 | | 1.2 | -7.25 | | | | | | | | | | -6.00 | | | | | | | 1.2 |
| -4.75 | | 1.2 | -7.00 | -6.75 | | | | | | | | -6.25 | | | | | | -5.75 | | 1.2 |
| -5.00 | | 1.2 | -7.25 | | | | | | | -6.75 | | -6.50 | | | | | | -6.00 | | 1.2 |
| -5.25 | | 1.2 | -7.50 | | | -7.00 | | | | | | | | | | -6.25 | | | | 1.2 |
| -5.50 | | 1.2 | -7.25 | | | | | | | | | | | | -6.50 | | | | | 1.2 |
| -5.75 | | 1.2 | -7.50 | | | | | | | | | | | -6.75 | | | | | | 1.2 |
| -6.00 | 1.75 | 1.2 | -7.75 | | | | | | | | | -7.00 | | | | | | | | 1.2 |
| -6.25 | | 1.2 | -8.00 | | | | | | | | -7.25 | | | | | | | | | 1.2 |
| -6.50 | | 1.2 | -8.25 | | | | | | | -7.50 | | | | | | | | | | 1.2 |
| -6.75 | | 1.2 | -8.50 | | | | -7.75 | | | | | | | | | | | | | 1.2 |
| -7.00 | | 1.2 | -8.25 | | | -8.00 | | | | | | | | | | | | | | 1.2 |
| -7.25 | | 1.2 | -8.50 | | | | | | | | | | | | | | | | | |
| -7.50 | 1.25 | 1.2 | -8.75 | | | | | | | | | | | | | | | | | |
| -7.75 | | 1.2 | -9.00 | | | | | | | | | | | | | | | | | |
| -8.00 | | 1.2 | -9.25 | | | | | | | | | | | | | | | | | |

INVENTORS
JOHN K. DAVIS
HENRY G. FERNALD
ARLINE W. RAYNER
BY Noble S. Williams
ATTORNEY 3,434,781
OPHTHALMIC LENS SERIES
John K. Davis, East Woodstock, Conn., and Henry G. Fernald, Winchester, and Arline W. Rayner, Auburn, Mass., assignors to American Optical Company, Southbridge, Mass., a corporation of Delaware
Continuation-in-part of application Ser. No. 145,851, Oct. 18, 1961. This application Mar. 15, 1965, Ser. No. 444,901
Int. Cl. G02c 7/06
U.S. Cl. 351—159
15 Claims

ABSTRACT OF THE DISCLOSURE

Negative toric ophthalmic lens series and semi-finished lens blanks therefor, of such controlled and related design as to care for a wide range of positive and negative prescriptive corrective requirements of both spherical and toric types in uniformly graduated dioptric steps and which corrective requirements take into consideration the various different physiological conditions of different eyes and provide the user a wide field of view having the errors of oblique fields reduced to minimum.

---

This is a continuation-in-part of application Ser. No. 145,851 filed Oct. 18, 1961, now abandoned.

This invention relates to improvements in an ophthalmic lens series. More particularly, the invention relates to improvements in an ophthalmic lens series of the negative toric type and is of such a carefully controlled optical design as to advantageously take into consideration variable physiological conditions of the eyes during normal use thereof and while also providing controlled prescriptive corrections needed for individual eye correction purposes. By following the teachings of the present invention as set forth hereinafter, it is possible to supply in the improved lens series of the present invention ranges of spherical and toric prescriptive lenses in uniformly graduated steps of diopters and selected fractions thereof.

It is to be understood, as above defined and as hereinafter stated, the term "negative toric" as applied to both a series of blanks and to a series of finished lenses of the type being considered in the present invention, and as is common in the ophthalmic trade, includes, in addition to negative toric lenses which have spherically curved front surfaces and torically curved ocular surfaces of selected ocular base curve values applied thereto, spherical lenses embodying the front spherical curvatures defined for the respective groups of lenses of the series (or groups of blanks of the series), and have in the case of each individual lens within a selected group on the ocular side thereof an overall spherical surface curvature of the same radius as that defined herein as the radius of curvature of the spherical ocular base curve for the lenses of said selected group.

When considering toric types of ophthalmic lenses, it is well to keep in mind that even though lenses of the negative toric type (lenses which have toric surfaces on the rear sides thereof) present more problems and difficulties as far as their manufacture is concerned than do lenses of the positive toric type, nevertheless, negative toric type lenses provide one very material advantage. They do not introduce into the viewed image shape magnification in the manner in which positive type lenses do. The two different front curvatures of a positive toric type lens magnify differently in directions at right angles to each other and thus yield what may be called an elliptical image, and when two such toric lenses are used together for the right and left eyes of an individual, it frequently happens that the two elliptical images provided thereby are not alike or are not similarly aligned and undesired spectacle-induced aniseikonia is more likely to occur. Accordingly, the negative toric type of ophthalmic lens series is preferred notwithstanding the manufacturing problems and difficulties mentioned above.

Another advantage obtained by the use of a negative toric type of ophthalmic lens is that each lens may be mounted by a bevelled edge formed thereon which lies closely adjacent the front surface of the lens. In this way, a better lens-to-frame connection is provided and most of the thickness at the bevelled edge will be rearwardly of the bevel and concealed by the spectacle frame.

In the design of a negative toric type ophthalmic lens series intended to care for a full range of prescriptive requirements, there are many different inter-related factors which must be adequately controlled or satisfied not only in accordance with the exacting requirements of the individuals for whom they are intended but also, in accordance with other related conditions which will be presently described.

Heretofore, ophthalmic lens series designs have been computed using the supposition that the human eye rotates about a fixed point within the eye called the center of rotation of the eye. However, extensive research and experimentation have shown that the eye does not actually rotate about a single point and also that the points about which it seems to rotate are not really near the line of sight of the eye or even near the center of the eye. For these reasons, that point within the eye through which light rays coming from oblique fields of view cross the optical axis of the lens positioned for use in front of the eye will be called the stop point of the eye; and it has been found that the effective location of this stop point for the many different functionings of the eye during normal use thereof varies considerably and this constitutes an important consideration in the improved optical design of the lens series of the present invention.

It is, accordingly, a principal object of the present invention to provide a negative toric ophthalmic lens series of improved optical performance, the individual lenses of which series provide a full range of prescriptive dioptric powers, both positive and negative spherical powers from +8.00 to −20.00D combined with cylindrical powers from zero to −4.00D, in carefully controlled related steps so as to best care for most individual needs and requirements coming within such ranges.

The invention is also directed to a series of semi-finished lens blanks having different spherically curved finished front surfaces thereon and which lens blanks are adapted to receive on the rear or ocular faces thereof different spherical and toric curvatures in such a controlled and related manner that a predetermined limited number of such semi-finished lens blanks may be used to care for a full range of prescriptive requirements including spherical powers from +8.00D to −20.00D combined with cylindrical powers from zero to −4.00D.

Another object of this invention is to provide means by which opthalmic lenses both of the spherical and negative toric type may be designed and fabricated to meet the needs of particular individuals, the fulfillment of said needs requiring correction with respect to whether the widest corrected field of view should be provided in the sphere, or cylindrical meridian of the lens, or averaged therebetween and with respect to the anatomical characteristics of the individual's eyeball and the position at which the lens must be located before the eyes thereby resulting in a stop distance either of an average dimension, or shorter, or longer than said average and as to whether it is desirable to correct for oblique fields of view for astigmatism for a near object distance, or for power and acuity (with the computation of said acuity including consideration of power, astigmatism, and lateral chromatic aberration) for intermediate and infinite object distances, or to a balancing of corrections of the respective aberrations for more than one object distance, said means, in the fulfillment of any of the above requirements, necessitating a nominal front curve power $D_N$ of the lens, computed in accordance with the effective power De in the sphere meridian of the lens, the cylinder value of the lens, the thickness, the index of refraction of the lens material and the particular requirements of the lens, and falling within the limits of the equation $$D_N = \frac{(De+19.4)^2}{54} - 1.0$$

and the equation $$D_N = \frac{(De+12.0)^2}{46} - 2.4 \pm 1.0$$

Another object is to provide a series of lens blanks of adjacent prescriptive powers embodying spherical and cylindrical corrections for myopic and hyperopic eyes ranging from given maximum myopic to given maximum hyperopic corrections and having the following errors for oblique fields of view corrected to an optimum with priority being given thereto in the order listed: (1) for astigmatism for a near object distance and at an angle of view of 20°, (2) for acuity for a one meter object distance and at an angle of 20°, (3) for acuity for an infinite object distance and at an angle of 20°, (4) and (5) for power in any meridian and at an angle of 20° for a one meter object distance and for an infinite object distance, (6) for astigmatism for a near object distance and at an angle of 30°, (7) for acuity for an infinite object distance at an angle of 30° and (8) for an angle of 40°, said series embodying several groups of lens blanks formed of a transparent medium of a given index of refraction and each blank of a respective group having the same front spherical curve, the front spherical curves of the different groups within said series being arranged in differing nominal dioptric power values with the front spherical curve of each group having as an element of its computation a stop distance for each lens when the resultant lens is in required position of use before the eye, said stop distance for each group being the shortest distance most likely to be required for the particular type of eyes to be corrected through the use of the lenses of said group, and with the shortest stop distance of the lenses employed in correcting myopic eyes being 27 millimeters in length and with the shortest stop distance of the lenses employed in the correction of hyperopic eyes being 24 millimeters, the curvature of each front spherical curve in each instance being so controlled that, when combined with the desired thickness for each lens and with the required spherical and toric prescriptive rear surface curves for producing the desired corrective lens, the errors for oblique fields of view in the priority indicated above will be reduced substantially to a minimum.

Another object is to provide a series of lens blanks of adjacent prescriptive powers embodying spherical and cylindrical corrections for myopic and hyperopic eyes ranging from given maximum myopic to given maximum hyperopic corrections and having the following errors for oblique fields of view corrected to an optimum with priority being given thereto in the order listed: (1) for astigmatism for a near object distance and at an angle of view of 20°, (2) for acuity for a one meter object distance and at an angle of 20°, (3) for acuity for an infinite object distance and at an angle of 20°, (4) for power in any meridian and at an angle of 20° for a one meter object distance and (5) for an infinite object distance, (6) for astigmatism for a near object distance and at an angle of 30°, (7) for acuity for an infinite object distance at an angle of 30° and (8) for an angle of 40°, said series embodying several groups of lens blanks formed of a lens medium of a given index of refraction and each blank of a respective group having the same front spherical curve, the front spherical curves of the different groups within said series being arranged in predetermined differing dioptric power value with the front spherical curve of each group having as an element of its computation a range of stop distances for the lens when the resultant lens is in required position of use before the eye, said range of stop distances for each group being that most likely to be required for the particular type of eyes to be corrected through the use of the lens blanks of said group, and with the range of stop distances of the blanks employed in correction myopic eyes being from 27 to 36 millimeters in length and with the range of stop distances of the blanks employed in the correction of hyperopic eyes being from 24 to 30 millimeters, and for near object distances the shorter stop distances of each range being used in said computation, and for intermediate and infinite object distances the longer stop distances of each range being used, the curvature of each front spherical curve in each instance being so controlled that, when combined with the desired thickness of lens medium for each lens and with the required spherical and toric prescriptive rear surface curves for producing the desired corrective optical powers, the errors for said oblique fields of view and in the priority indicated above will be reduced substantially to a minimum.

Another object is to provide a series of lens blanks of adjacent prescriptive powers embodying spherical and cylindrical corrections for myopic and hyperopic eyes ranging from given maximum myopic to given maximum hyperopic corrections and having the following errors for oblique fields of view corrected to an optimum with priority being given thereto in the order listed: (1) for astigmatism for a near object distance and at an angle of view of 20°, (2) for acuity for a one meter object distance and at an angle of 20°, (3) for acuity for an infinite object distance and at an angle of 20°, (4) for power in any meridian and at an angle of 20° for a one meter object distance and (5) for an infinite object distance, (6) for astigmatism for a near object distance and at an angle of 30°, (7) for acuity for an infinite object distance at an angle of 30° and (8) for an angle of 40°, said series embodying several groups of lens blanks formed of a lens medium of a given index of refraction and each blank of a respective group having the same front spherical curve, the front spherical curves of the different groups within said series being arranged in predetermined differing nominal dioptric power values with the front spherical curve of each group having as an element of its computation a range of stop distances for the lens when the resultant lens is in required position of use before the eye, said range of stop distances for each group being that most likely to be required for the particular type of eyes to be corrected through the use of the lens blanks of said group, and with the range of stop distances of the blanks employed in correcting myopic eyes being from 27 to 36 millimeters in length and with the range of stop distances of the blanks employed in the correction of hyperopic eyes being from 24 to 30 millimeters, and for near object distances the shorter stop distances of each range being used in said computation, and for intermediate and infinite object distances the longer stop distances of each range being used, the nominal curvature ($D_N$) of each front spherical surface in each instance being so selected and controlled relative to the spherical prescriptive power value (De) to be provided by the lens that same will fall substantially within the range of values of $D_N$ determined by the equation $$D_N = \frac{(De+19.4)^2}{54} - 1.0$$

and the equation, $$D_N = \frac{(De+12.0)^2}{46} - 2.4 \pm 1.0$$

and when said front curvature of such nominal power is combined with the desired thickness of lens and with the required spherical and toric presciptive rear surface curves for producing the desired corrective lens, the errors for oblique fields of view for 20° will be reduced to substantially no more than 5% of the prescriptive power of the lens considered in the strongest meridian thereof, for 30° substantially no more than 8% and for 40° substantially no more than 12%.

Another object is to provide a series of finished corrected lenses resulting from forming a finished optical surface of the character described on the concave or ocular surface of a series of lens blanks as set forth above.

Another object of this invention is to provide means by which opthalmic lenses, both of the spherical and negative toric type may be designed and fabricated to a particular individual's requirements and where these needs may demand a consideration of the refractive correction with respect to whether the widest corrected field of view should be provided in the sphere or cylinder meridian of the lens, or averaged therebetween, and with the respect to the anatomical characteristics of the individual's eyeball and the position at which the lens must be placed before the eyes thereby resulting in a stop distance either of an average dimension, or shorter, or longer than said average, and as to whether it is desirable to correct for oblique fields of view for astigmatism for a near object distance, or for power and acuity including the correction of lateral chromatic aberration for longer object distances, or to a balancing of corrections for more than one object distance with respect to the aberrations mentioned above for the respective object distances.

Another object of the invention is to provide a general purpose lens series, and semi-finished blanks therefor, which are designed to correct for substantially all of the above-mentioned aberrations in the priority indicated with the front curves thereof of such nominal power as to satisfy the equation $$D_N = \frac{(De+17.5)^2}{48} - 1.3 \pm 1.0$$

Another object of this invention is to provide a lens series which is designed to correct astigmatism for near object distance for individuals with particularly long stop distances with the nominal front curve powers $D_N$ of the lenses of such a lens series lying substantially between the values provided by the following equations:

$$D_N = \frac{(De+19.5)^2}{54} - 3.0 \pm 1.0$$

and $$D_N = \frac{(De+12.0)^2}{46} - 2.4 \pm 1.0$$

Another object of this invention is to provide an improved lens series which is such that the fulfillment of any of the above special needs may be satisfied by selecting, from said series, a lens or blank having a front curvature such that its nominal power $D_N$ when related to the refractive power value De in the sphere meridian of such lens on the ocular side thereof lies between the values established by the equation:

$$D_N = \frac{(De+19.4)^2}{54} - 1.0$$

and by the equation $$D_N = \frac{(De+12.0)^2}{46} - 2.4 \pm 1.0$$

While the specification and drawings show and describe a series of spherical lenses ranging from +8.00D to −20.00D as embodying the essence of the invention, particular emphasis is directed to that part of the series of spherical lenses lying between −2.00D to −20.00D as well as negative toric lenses having cylinder values ranging from near zero to −4.00D combined with said spherical values of +8.00D to −20.00D, all of which latter lenses, when formed according to the teachings of the present invention, produce outstanding results.

The invention also includes a method by which a lens within the scope of the improved lens series set forth herein may be provided according to particular requirements of an individual.

Other objects and advantages of the invention will become apparent from the detailed description which follows when taken in conjunction with the accompanying drawings in which:

FIG. 4A is a fragmentary sectional view similar to that of FIG. 4 but showing a lens of multifocus type.

FIGS. 6 and 7 are bar graphs for showing acceptable tolerances for chosen criteria being considered by two different lenses of the improved lens series;

FIG. 9 is a surfacing chart for use in providing prescriptive lenses embodying the invention;

FIG. 13 is a diagrammatic view of a lens and eye positions for use in explaining the invention;

FIGS. 14 and 15 are diagrammatic plan and elevational views of an eye in different positions of use in explaining the invention;

FIG. 17 shows a modified form of surfacing chart for use in providing prescriptive lenses embodying the invention.

Figure 1:
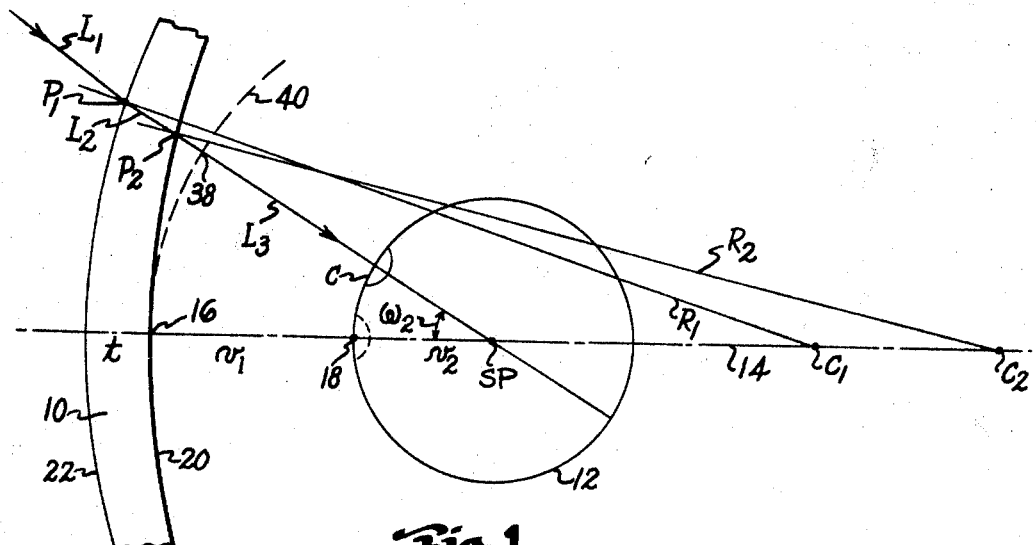
FIG. 1 is a diagrammatic sketch for use in discussing certain operative relationships between an ophthalmic lens and a patient's eye.

In order to have a clear understanding of certain fundamental relationships which exist between different parts of a spectacle lens and the eye using the lens, and in order to establish certain ophthalmic definitions to be used in the disclosure which follows, there is diagrammatically shown in cross-section in FIG. 1 a portion of a lens 10, in normal spaced relation relative to an eye 12. A dot-dash line 14 represents the optical axis of the lens 10 and, of course, could also be thought of as extending in the direction of the straight-ahead line of sight through the lens. This axis extends through what may be for convenience called the stop point SP of the eye and also through a central point 16 on the rear surface of the lens indicating the rear vertex or ocular vertex thereof. The front surface of this lens is indicated by numeral 22 and is spherically curved about axial point $C_1$ and has a radius of curvature indicated by numeral $R_1$.

The distance from stop point SP to central axial point 18 which will be located on the front surface of the cornea C of the eye when the eye is looking straight ahead, is designated by reference character $v_2$ and the distance from this central axial point 18 to the rear vertex of the lens is indicated by $v_1$. From this figure, it will be appreciated that if the eye is rotated about stop point SP a selected angular amount $\omega_2$ so as to look in the off-axis direction indicated, the off-axis light ray $L_1$ will enter the front surface 22 of the lens and will be refracted slightly toward a normal to the surface at this interception point so as to follow the slightly different path indicated by that part of the ray marked $L_2$.

When this light ray reaches the rear surface 20 of the lens at Point $P_2$, it will again be refracted but this time in the opposite direction away from a normal through the point so as to follow the light path $L_3$. Thereafter, it will enter the eye 12 through the center of the cornea C when looking in that direction and will pass through the stop point SP of the eye before reaching the retina thereof. The center of curvature for the rear surface 20 of the lens as shown in this figure is indicated at the axial point $C_2$ and its radius of curvature is designated $R_2$.

The distance from the ocular vertex 16 of the lens to the cornea taken along the optical axis 14 has already been indicated as $v_1$ and the distance along this axis from the cornea to point SP has been indicated as $v_2$. Hereinafter, these two distances, when considered together, may be called the stop distance. Heretofore, in computing lens series designs, the distances $v_1$ and $v_2$ have commonly been considered as being substantially equal to 14 mm. and 13 mm., respectively. However, recent extensive experimentation has shown that the eye does not rotate about the center of the eyeball, or even about a single point in the eye, but rather about different points during different uses thereof. Also, these different points are remote from the line of sight of the eye. In addition to these conditions, it has been recognized that the stop position SP in the eye varies with different individuals having the same prescription and varies quite systematically between individuals having different prescriptions.

Accordingly, it is best to consider that point SP in optical terms is the "stop" point of the system and is the point through which rays coming from oblique fields of view cross, for example, ray $L_3$ crosses the optical axis 14.

Figure 3:
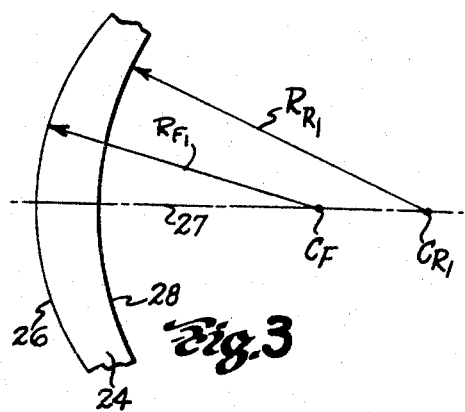
FIG. 3 is a fragmentary sectional view of the lens of FIG. 2, having been taken upon section line 3—3 thereof.
Figure 4:
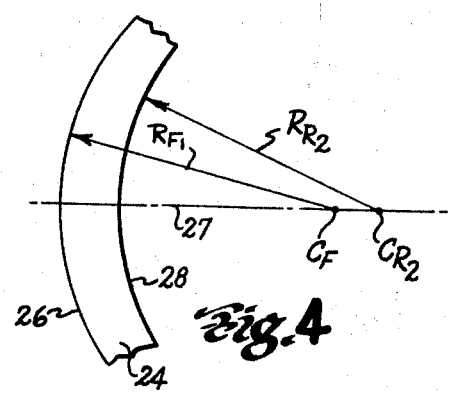
FIG. 4 is a fragmentary sectional view of the lens of FIG. 2 taken upon section line 4—4 thereof.
Figure 2:
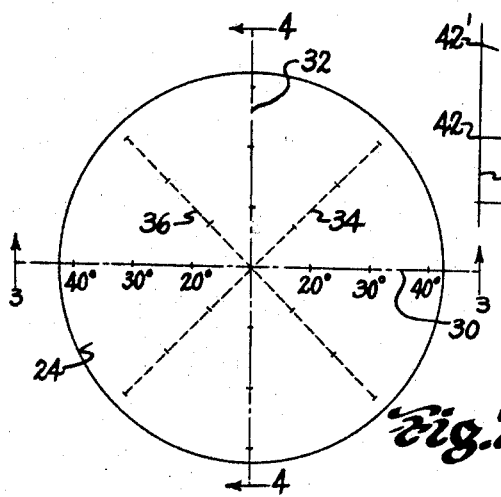
FIG. 2 is a sketch showing the front view of an ophthalmic lens embodying the present invention.

In FIG. 2 is shown the front view of a negative toric ophthalmic lens 24 embodying the present invention and in FIGS. 3 and 4 are shown two different cross sections through this lens. These sections have been taken upon section lines 3—3 and 4—4, respectively of FIG. 2 and are at right angles to each other. Each negative toric lens of the present lens series is provided with a spherically curved front surface and a torically curved rear or ocular surface. Thus, in FIGS. 3 and 4, it will be seen that surface 26 is spherically curved and has its center of curvature located at $C_F$ on the optical axis 27 of the lens and a radius $R_{F1}$ while the rear surface 28 is a toric surface with two different curvatures and two different centers of curvature. In fact, the surface 28 is a toric surface having two different circular curvatures and of the type sometimes referred to as a "donut" toric surface since it may be generated by rotating a circularly curved section about an axis, with said section having a shorter radius of curvature than the distance from said axis to said curved section.

In FIG. 3, it will be seen that ocular surface 28 has a center of curvature at $C_{R1}$ and a radius $R_{R1}$. In FIG. 4, however, the surface 28 is shown as having a different center of curvature $C_{R2}$ and a radius of curvature $R_{R2}$ which is of a lesser length. For this reason, the section shown in FIG. 3, wherein the flattest curve on the rear surface of the lens is shown, may be referred to as the principal meridian or the sphere meridian of the lens and the section in FIG. 4, wherein the strongest curvature appears may be referred to as the minor meridian or the cylinder meridian of the lens.

In FIG. 2, wherein the front view of the lens appears, two lines 30 and 32 have been drawn so as to pass through the center of the lens and thus intersect the optical axis 27 of the lens. Upon line 30 and outwardly in both directions from the center thereof, marks have been made to indicate the locations at which a line of sight at 20 degrees, at 30 degrees and at 40 degrees deviation would pass through the lens. These points hereinafter will be referred to as the prime points since they lie in the sphere meridian of the lens. The prime points to opposite sides of the center of the lens will have the same computed aberrations.

Likewise, upon line 32, similar marks have been made and these will be hereinafter referred to as the double prime points of the lenses. These are the points for which computations which will appear later have been made for the steepest curves on the lens. In a similar manner, two lines 34 and 36 have been drawn through the center of the lens in such a manner as to be midway between lines 30 and 32 and similar points thereon are indicated and hereinafter will be referred to as the 45° points on the lens. Thus, it will be noted that there are eight points of interest, say at 40° deviation, on each lens of the improved series in contrast with merely two prime and two double prime points for most lenses of earlier designs. It is, therefore, important to consider these points at 45 degrees.

By following the teachings of the present invention and with careful consideration of the various physiological conditions of the human eye, which have already been referred to above, and with due consideration as to certain different optical aberrations and performances at different object distances and different prescriptive requirements of patients, it has been found that the several specific related physical and optical values of the lenses of the present negative toric lens series can be controlled so as to provide improved results. It has been found, for example, that the stop distances from approximately 24 to 27 mm. are best for lenses of the improved series for the viewing of objects at near object distances (0.3 to 0.4 meter) with positive prescriptive values of sphere powers between plus 8.00D to zero and with cylinder values from 0 to minus 4.00D. It has also been found that stop distances from approximately 27 to 30 mm. are preferred for lenses of the series for viewing distant or far-away objects, such as objects at infinity, when using positive prescriptive values of sphere powers between plus 8.00D to zero and with additional cylinder powers from zero to —4.00D.

Likewise, it has been found that improved optical performance can be obtained by lenses of the series for viewing objects at said near object distances by using stop distances between approximately 27 and 30 mm. for prescriptive values between zero and minus 8.00D sphere power and with cylinder values from 0 to minus 4.00D. For viewing distant objects when perscriptive values of sphere powers between zero and minus 8.00D are used and with additional cylinder powers from 0 to minus 4.00D, stop distances between approximately 33 and 36 are desirable.

When prescriptive values of sphere power between minus 8.00 and minus 20.00D and with additional cylinder powers from zero to minus 4.00D are to be used with lenses for viewing at said near object distances, stop distances between approximately 28 and 31 mm. are preferred. However, when lenses of such negative sphere and cylinder values are to be used for viewing far-away object fields, stop distances between approximately 31 and 34 are best.

One reason for use of the above varying distances is that, for certain prescriptions, the errors for various different fields of view are sensitive to the exact location of the stop position in the eye. Also, the distance from the cornea to the stop position in the eye varies such that for most plus prescriptions from 8.00D to zero, this distance varies between 12 and 14 mm. or a little more. For prescriptions from zero to minus 8.00D, this distance varies between 12 and 16 mm. or a little more, and for moderate myopes in this prescriptive range who tend to have deeper set eyes and steeper inside curves on their lenses and lenses which tend to rest farther from the eyes, the lens to cornea distance is from 15 to 17 mm. or a little more. Also, in prescriptive range from minus 8.00 to minus 20.00, the cornea to stop position varies between 13 and 18 mm. or so.

Since no single ophthalmic lens can possibly contain all of the many features and corrections which might be desirable for best seeing under all conditions of use and, on the other hand, all of the lenses of a series of these lenses should be so controlled and related as to jointly best care for as many of these features as possible, in the formulation of the present improved lens series, a number of considerations have been taken into account in that general order believed to be of the most importance to the patients being prescribed for. The first of these considerations relates to the control of astigmatism (A) at near object distances from 0.3 to 0.4 meter (approximately 13 to 16 inches) and at 20° angle of deviation outwardly from the optical axis of the lens on the prime, double prime and 45° meridians of the lens, and wherein, under most conditions, the astigmatic error will not be allowed to exceed 0.08D and, under most adverse conditions, will not exceed 0.12D. The second consideration relates to the acuity (B) which is obtainable at a one meter object distance and at a 20° angle of deviation, and wherein, under most conditions, errors of focus will not exceed 0.10D and, under adverse conditions wherein the minimum obtainable aberration is greater than this amount, the freedom of design for other purposes is restricted to the selection of designs wherein acuity error is no greater than 25% above the minimum value. The third consideration is the acuity obtainable at an object distance of infinity and at a 20° deviation angle, and with like tolerance limitations.

The fourth consideration is the tangential and sagittal power errors (C) at one meter object distance and for 20° angle of deviation and wherein the error tolerances have been set at 0.12D for most cases and is 0.18D in most adverse cases. The fifth consideration is the tangential and sagittal power errors at infinity and for a 20° deviation angle, and with like tolerance limitations. The sixth consideration is the astigmatism at near object distances for a 30° angle of deviation and on the prime, double prime and 45° meridians of the lens, and with astigmatic tolerances limited to 0.08D when possible and in most cases limited to 0.12D. The seventh and eighth considerations are acuity at infinity for a 30° angle of deviation, and acuity at infinity at 40°, and with acuity tolerances like those mentioned above.

The preceding eight considerations or criteria in their order of prority (and as applied to two specific R$x$ lens values) also appear in a convenient tabulated form at the left side of the bar graph charts of FIGS. 6 and 7, and a convenient grouping of selected values for tolerances for the above criteria is given in the following table:

TABLE A

TOLERANCES

For R$x$'s plus 4.00 through −6.00D with cyls. 0.00 to −4.00D

| | Primary Tolerance | Secondary Tolerance | Other tolerances if needed |
|---|---|---|---|
| Astigmatism at 20°  | 0.08D | 0.12D | In 0.06D steps. |
| Astigmatism at 30°  | 0.12D | Others if needed in 0.06D steps. | Do. |
| Acuity with color | 0.10D | Minimum plus 25% of minimum. | Minimum plus 0.10D. |
| Power Error | 0.12D | 0.18D | In 0.06D steps |

NOTE.—For other R$x$ values between +8.00D and −20.00D with cyls from 0 to −4.00D, secondary values are taken as primary tolerances.

Certain of these considerations have to do with acuity. As used in this disclosure dealing with ophthalmic optics, the word "acuity" means the ability to recognize objects, such as the ability to read certain letters of a given size at a certain distance, and the numbers which are used to describe the acuity factor of a lens are indices of the dioptric blurring which occurs because of errors present for a particular line of sight through the lens and eye position under consideration. In fact, it can be shown by formula that the acuity, $\Sigma$, depends largely upon the tangential or sagittal power error T or S in the better of the two meridians of the lens and the difference between the power error in that meridian and the other meridian plus a lateral color factor which is discussed hereinafter.

$$\Sigma = \frac{\overline{T+S}}{2} - \frac{\overline{\overline{T-S}}}{2} + 0.8(\overline{\overline{T-S}}) \tag{1}$$

$$\Sigma 0.5(\overline{T+S}) + 0.3(\overline{\overline{T-S}}) \tag{2}$$

As used above and hereinafter a short bar over an individual letter means the absolute value thereof while a long bar over two or more letters or groups of letters comprising a mathematical expression separated by plus or minus signs means the absolute value of the sum or difference, as the case may be, of all parts under the bar.

Accordingly, in the computations of the lenses of the series, it has been assumed that the destruction of information is a function of the magnitude of the power error in that meridian of the lens which has the least error plus approximately eighty percent of the difference between this error and the meridian which has the greater error.

Thus, when applied to the lens of FIG. 2 and to the principal or prime meridian and the minor or double prime meridian, 30 and 32, thereof as well as to the 45° lines 34 and 36 therebetween, the acuity $\Sigma_A$, $\Sigma_B$ and $\Sigma_{45}$ for these three lens sections, respectively, can be expressed $$\Sigma_A = 0.5(\overline{T'+S'}) + 0.3(\overline{\overline{T'-S'}}) \tag{3}$$

When combined they provide $$\Sigma_B = 0.5(\overline{T''+S''}) + 0.3(\overline{\overline{T''-S''}}) \tag{4}$$

$$\Sigma_{45} = 1.0\left(\overline{\frac{T'+T''}{2} + \frac{S'+S''}{2}}\right) + 0.6\left(\overline{\overline{\frac{T'+T''}{2} - \frac{S'+S''}{2}}}\right) \tag{5}$$

$$\Sigma = \frac{\Sigma_A + \Sigma_B + 2\Sigma_{45}}{4} = 0.125(\overline{T'+S'+T''+S''}+$$

$$\overline{T'+T''+S'+S''}) + 0.075(\overline{\overline{T'-S'}} + \overline{\overline{T''-S''}} +$$

$$\overline{\overline{T'+T''-S'+S''}} \tag{6}$$

Of importance in this lens series design is astigmatism as it is known in ophthalmic lens design, the difference in tangential and sagittal power at a selected point. Astigmatism is positive when the tangential error exceeds the sagittal error. It is a well-known fact that astigmatism in itself does not destroy visual information as much as spherical power errors of the same numerical magnitude provided one meridian of the asitgmatic focus is fairly near the desired value.

Another aberration affecting the information being transmitted by the lens is lateral color. If the patient sweeps his eyes across an ordinary spectacle lens, color fringes are frequently visible even if the lens is of weak power. These fringes tend to destroy information in the meridian through which the line of sight extends, and this meridian is generally termed the tangential meridian.

Therefore, in computing an index of acuity, or, acuity dioptric blur index, for each lens of the series, not only has some astigmatism been allowed to remain in order to keep the total power error at a low value but also there has been added to the computation a number indicating the destruction of information due to lateral color. Destruction of information due to power error and astigmatism is a function of pupil size; the larger the pupil the more a given dioptric value of power and astigmatic error destroys information. But since lateral color is a directional aberration affecting the angularity of the entering rays rather than an aberration involving focus, it is independent of pupil size. For large pupils, the monochromatic or power errors are more harmful than the lateral color, and for small pupils, the lateral color is more destructive of information than are power errors. For this reason, the blur in the tangential meridian has been weighted linearly; that is, one prism diopter of lateral color has been assumed to destroy information in amounts equivalent to one diopter of tangential blur.

One prism diopter is defined as one hundred times the tangent of the angle of deviation of the ray through the lens divided by the reciprocal dispersion ($Nu$) value of the glass. It gives information in the following way: one prism diopter of lateral color would cause a separation of the C and F lines of the spectrum of one part in a hundred. Or, that is to say that at one hundred feet, a white candle would appear to be a red candle and a blue candle separated by one foot of intermediate colored blur, if there is present one prism diopter of lateral color.

The actual acuity dioptric blur index, $\Sigma B$ (acuity including color) for each point of the toric lens is obtained by adding to the dioptric value of the tangential error, $\overline{T}$ the dioptric value of the lateral color $\overline{C}$, both in absolute values. From this is subtracted the absolute value of the sagittal error $\overline{S}$, and to the smaller of the two above factors is added 80% of the absolute value of the difference. Thus for the prime, double prime and 45° points, the acuity blur index is as follows:

$$\Sigma B_A = 0.5(\overline{T'} + \overline{C'} + \overline{S'}) + 0.3(\overline{\overline{T'} + \overline{C'} - \overline{S'}}) \quad (7)$$

$$\Sigma B_B = 0.5(\overline{T''} + \overline{C''} + \overline{S''}) + 0.3(\overline{\overline{T''} + \overline{C''} - \overline{S''}}) \quad (8)$$

$$2\Sigma B_{45} = 0.5(\overline{T' + T''} + \overline{C' + C''} + \overline{S' + S''}) +$$
$$0.3(\overline{\overline{T' + T''} + \overline{C' + C''} - \overline{S' + S''}}) \quad (9)$$

$$\Sigma B = \frac{\Sigma B_A + \Sigma B_B + 2\Sigma B_{45}}{4} =$$
$$0.125(\overline{T'} + \overline{C'} + \overline{S'} + \overline{T''} + \overline{C''} + \overline{S''} +$$
$$\overline{T' + T''} + \overline{C' + C''} + \overline{S' + S''}) +$$
$$0.075(\overline{\overline{T'} + \overline{C'} - \overline{S'}} + \overline{\overline{T''} + \overline{C''} - \overline{S''}} +$$
$$\overline{\overline{T' + T''} + \overline{C' + C''} - \overline{S' + S''}}) \quad (10)$$

Thus, it will be seen that values for each point on the toric lens are given by these formulas. The 45° values are arrived at by using the average $\overline{T}$, $\overline{S}$ and $\overline{C}$ values for the prime and double prime points, and then treated in the same manner as the prime and double prime points, the 45° value, of course, being multiplied by two since there are two of these meridians. Values for all three points (prime, double prime and 45° points) are then averaged. The final algebraic operation yields the acuity blur index which is used in selecting the designs of lenses and determining which base curves for the sphere meridian on the ocular side of the lenses are most desirable from the acuity standpoint.

The lens power as defined herein is the reciprocal of the back focal length of the lens. Also, when reference is made to the power error for a certain location in an oblique field of view through the lens, it means the error which is present at a line of sight reference point upon an imaginary reference circle in space rearwardly of the lens, such as point 38 upon dotted circle 40 and which circle is tangent to the rear surface of the lens at the ocular vertex 16 (in FIG. 1) and has its center of curvature at the stop SP. Thus, point 38 at the intersection of the line of sight $L_3$ with circular curve 40 would be such a point and would be at a distance from SP equal to the stop distance $v_1 + v_2$. It is at this reference point that power errors and astigmatic errors are considered, and are defined in terms of the reciprocal of the focal length; or, in other words, the power at the reference point 38 minus the power at the vertex of the lens. A plus power would mean more positive convergence of the ray bundle at the reference point, more positive convergence than at the center, and a minus, less convergence of the ray bundle at said point.

When near object distances are being used in the computations, the value used for the power of the lens is the number arrived at by taking the reciprocal of the paraxial distance from the lens to its back focus for that object distance, although the lens may at other times be referred to by its prescriptive power for an infinite object distance. In other words, the power error and the power which are actually used in computations for lenses at this near object distance refer to the actual distance under consideration.

One difference in terminology which occurs in this disclosure when compared with other references has to do with the near object distances. When a person with normal eyesight and without spectacles views a central point in a flat plane perpendicular to his straight-ahead line of sight and then turns his eyes to view a similar point obliquely oriented thereto but in this plane, he must relax his accommodation somewhat because of its greater distance from the eyes in order to see the second point clearly. This, he does automatically. Also, it is known that the two eyes accommodate differentially because of the difference in distances to such oblique points.

It is believed, because of the above, that a spectacle lens should normally be designed to correct only the refractive errors of the eyes and should leave the patient as much of his normal accommodation, convergence, relaxation of accommodation and other visual functions as possible. Therefore, in considering the performance of the lens series design relative to others in order to select the best design, one should consider for near object distances a design which upsets the normal actions of the eye as little as possible.

Figure 5:
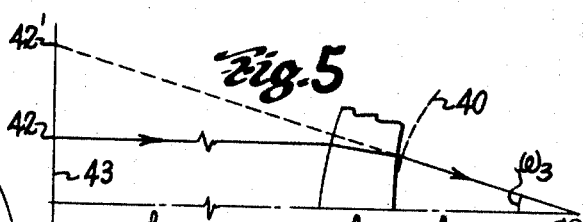
FIG. 5 is a diagrammatic sketch for use in describing the manner in which the power errors of lenses are computed.

FIG. 5 illustrates the factors which have been considered in computing the power error by what may be called the "lens contribution" method for oblique fields of view. As the patient views an object, such as at point 42, lying in a flat plane 43 at a finite object distance from the eye and at an oblique angle $\omega_3$, (and if the lens power is not taken into consideration), the apparent distance to the object will be the distance from stop point SP taken along the dotted line extension of that part of the line of sight disposed between the lens and the eye to the imaginary object point 42'. This apparent distance $d_s$, can be described as being equal to $$d_s = \frac{d_1 + d_2 + d_3}{\cos \omega_3} \quad (11)$$

Since all vergencies are being referred to the reference circle 40 with its radius equal to the stop distance $d_3$, the distance along the oblique line from the reference circle to the plane 43 containing point 42' will be:

$$\frac{d_1 + d_2 + d_3}{\cos \omega_3} - d_3 \quad (12)$$

The oblique power, $P_o$, or vergency of the light at the reference circle 40 (without the lens), then would be the reciprocal of the last equation:

$$P_o = \frac{1}{\frac{d_1+d_2+d_3}{\cos \omega_3} - d_3} \quad (13)$$

Also the power, P, for a straight-ahead line of sight (when no lens power is included) would be:

$$P = \frac{1}{d_1+d_2} \quad (14)$$

Accordingly, if the change in power between that for the oblique field of view and that for the straight-ahead line of sight (when no lens power is included) is to be considered, then from Equations 13 and 14 we have:

$$P_o - P = \Delta P = Z = \frac{1}{\frac{d_1+d_2+d_3}{\cos \omega_3} - d_3} - \frac{1}{d_1+d_2} \quad (15)$$

$$Z = \frac{\cos \omega_3}{d_3(1-\cos \omega_3)+d_2+d_1} - \frac{1}{d_1+d_2} \quad (16)$$

and wherein Z is the change in power error due to apparent position of object.

Thus, we have the change in vergency from straight-ahead viewing to oblique viewing as the eye sweeps from one to the other and this change is referred to reference circle 40, or in other words to stop distance $d_3$.

The tangential power errors and the sagittal power errors and the astigmatism are now computed by usual methods and referred to reference circle 40, but these errors are errors in the vergency of the tangential, sagittal and astigmatic foci, from which is subtracted the change in power error Z. This latter error, of course, is the change of power due to the position of the object for the apparent line of sight (without the lens), or in other words, by subtracting Z the contribution of the lens alone to oblique vergency has been computed. It is obvious that when the object distance is long, a straight comparison between the powers at the selected point on the reference circle and at the vertex of the lens can be used.)

Heretofore, the prior lens designs have concentrated on trying to average the aberrations experienced at the prime and double prime points on the lens. Earlier lens series have not been designed so as to take into account the axis of the cylinder of the prescription and the probable needs of the patient, in view of the fact that with a cylinder prescription, it is possible to get a better corrected lens in the horizontal meridian if one knows beforehand that the lens is going to be worn at a certain preselected axis orientation, so that the lens may be weighted in the horizontal or vertical meridan accordingly. In other words, from graphs and tables of this disclosure, it is evident that for certain prescriptions, particularly negative ones with strong cylindrical corrections, considerably better results can be obtained for a patient for individual points of the toric than could be obtained, on the average, heretofore.

By known methods of trigonometric ray tracing, and while using near, intermediate and infinity as object distances and at 20°, 30°, and 40° angles of viewing, the following prescriptive values in 2.00 diopter steps for the sphere power of various ocular base curve values were computed.

Various ocular base curve values in 1.50 diopter steps were used as indicated in the table below. In addition to Rx sphere powers, cylinder values of −2.00, −4.00 and −6.00 diopter were also used. Stop distances of different values as indicated in the table were used in the computations and the errors in power astigmatism and acuity for the prime, double prime and 45° points were computed.

TABLE AA

| Rx Sphere Values Including 0, −2, −4, −6 Cyl. | Stop Distance, mm. | Ocular Base Curve (in 1.50D Steps) |
| --- | --- | --- |
| +8.00 through −2.00D | 24, 27, 30 | +2.00 through −10.00D. |
| 0.0 through −8.00D | 27, 30, 33, 36 | −4.00 through −11.50D. |
| −2.00 to −4.00D | 33, 36 | +0.50 through −3.00D. |
| −8.00D | 28, 31, 34 | −5.50 through −13.00D. |
| −10.00D | 28, 31, 34 | −7.00 through −14.50D. |
| −12.00D | 28, 31, 34 | −8.50 through −16.00D. |
| −14.00D | 28, 31, 34 | −10.00 through −17.50D. |
| −16.00D | 28, 31, 34 | −11.50 through −19.00D. |
| −18.00D | 28, 31, 34 | −13.00 through −20.50D. |
| −20.00D | 28, 31, 34 | −14.50 through −22.00D. |

Table AA indicates what stop distances and base curves were used for various sphere values and in each case cylinder values were included.

In the strongly negative prescriptive range—below 16 diopters—the field of view was limited to 30° for weak cylinder values and to 20° for stronger cylinders; and for certain base curves combined with certain spheres, 20° was the only angle investigated because of the magnitude of the aberrations wider fields of view.

Each of these combinations was then analyzed for the six different considerations already mentioned (such as (1) astigmatism at near distance and for a 20° angle) to see which base curves at the prime, double prime and 45° points on the lenses and at the angles of viewing being considered and for selected stop distances gave the best results and have their aberrations within the indicated allowable tolerances.

Figure 6:
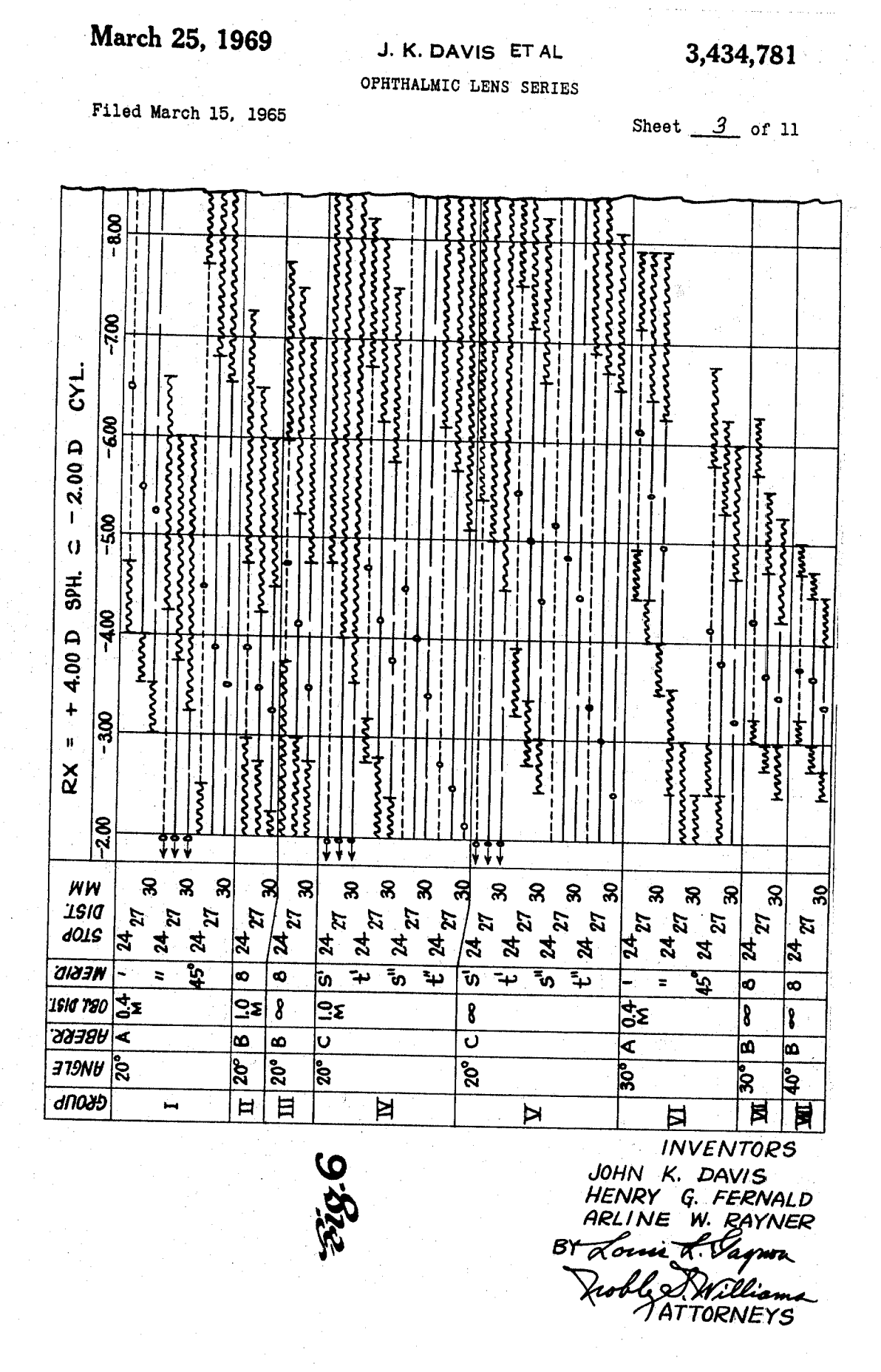
Figure 7:
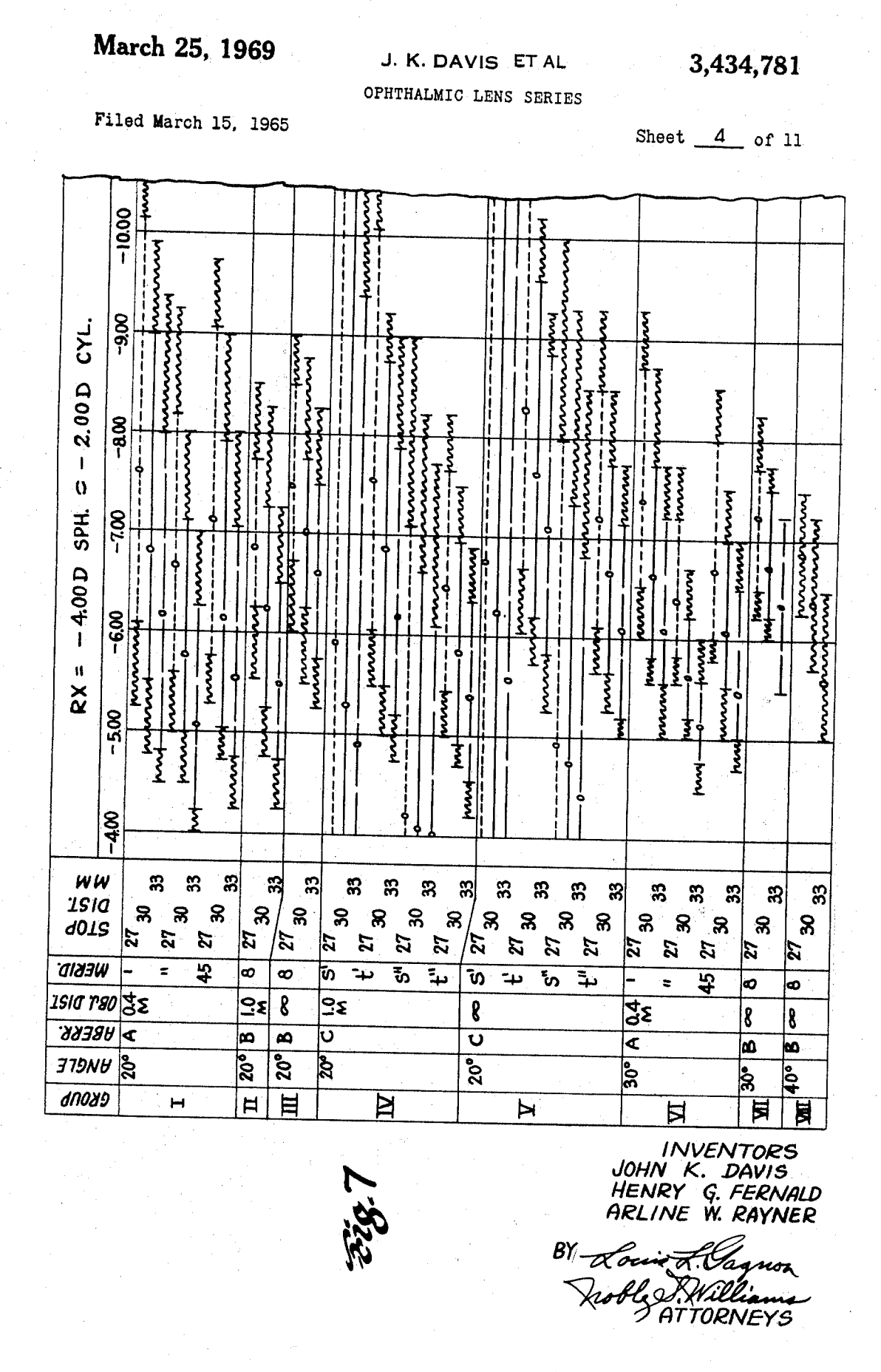

Therefore, different base curve values in bar graph charts like those of FIGS. 6 and 7 and tables which furnish lenses particularly corrected for power or astigmatism at one point of the toric lens, or other, are given. Sometimes it is impossible to correct for one point at all well without seriously impairing the other. At times quite good corrections can be obtained for both astigmatism and power separately, or even together, when one point of the toric is emphasized. At other times, it is possible to correct an "eliptical field," such as a lens designed to care for the errors both at the prime points at 30 degrees and the double prime points at 20 degrees within moderate tolerances, or even approximately equally. Or conversely, a lens can be designed to care for errors at the double prime points at 30 degrees and for the prime points at 20 degrees; and it is convenient to refer to such lenses as elliptical field lenses. An optician or eye doctor in ordering such lenses would specify an axis at 90 degrees or at 180 degrees and whether the horizontal field or the vertical field would be used most.

Another factor which is considered in the graphs and charts is power error and this is somewhat like acuity except that the color, although present, is not here corrected for and astigmatism is not considered. However, tangential and sagittal power errors are both maintained as close to zero as possible, on the assumption that if these errors in both meridians are small, there will be no stimulus to accomodate for and no disturbance due to astigmatism, if power errors can be held to values less than .10 diopters for most prescriptions. Because color has been considered in considering acuity, it has not been considered in considering power error. This, of course, will assist the doctor in ordering lenses, in that he does not have to consider color unless he believes it necessary.

In ophthalmic lens design the terms "standard" curves and "true power" curves are often used. In calculations for the graphs and charts herewith presented (with the exception of FIG. 9 which will be later discussed), true power curves have been used for the ocular sphere and toric curves, or in other words if a 3.00D curve of true power is specified, it would be a curve which would give 3.00 of dioptric power using a glass having a 1.5232 index. A standard curve, on the other hand, is the curvature which is assumed in most optical shops and optical factory usage when the index of the glass is not specified and is based on a 1.53 index.

A term also used in ophthalmic design is "nominal" curve and has been used in this disclosure with reference to the spherical curvatures employed upon the front surfaces of both the semi-finished blanks and also the finished lenses of the series. The nominal front curve value of a lens is not the true power of that surface but instead is the power that that surface will contribute when transferred through the thickness of the lens and, of course, would be described in the same terminology (standard power or true power) as the ocular curve associated therewith; this making the calculations of the ocular curve and finished prescription more convenient.

Since the thickness of the lens affects the value of the front surface as referred to the back surface of the lens, the true power of the front curve is never equal to the nominal power of this curve unless it is flat. For example in considering a +4.00D prescription with a minus 6.00 inside curve, this minus 6.00 curve would be a true minus 6.00 curve on a 1.523 index glass. The front curve would be a nominal curve of plus 10. Actually, however, this curve would be some fraction less than a plus 10, due to the thickness of the lens and the need for reducing the power in order that the lens at its rear surface be a plus 10 before the corrective surface is added. In order to translate the true power in the charts and graphs which are here disclosed to standard curves, these curves would have to be increased in value by the ratio of .53 to .5232. Or, the radii of the lenses would be obtained by dividing the true power curves listed on the charts into .5232.

It is well to point out at this time that while the calculations have been made using glass at 1.523 index, it has been found from study that the calculations apply within very close tolerances for materials of other indices when the curvatures are maintained constant (not the power). Therefore, to translate a lens series from glass at 1.523 to plastic at an index of 1.49, first obtain the radii to be used by finding the inside curves from the charts (which would be the prescription minus the front curve listed, where the rear curve is not listed). Then with this dioptric value for the rear curve and the front curve, obtain the radii of the rear curve, and with these radii redesign the plastic lens series. The marginal errors listed in the tables and charts hold remarkably well when the radii of the base curves are maintained (but they do not hold as well when the power of the base curve is maintained).

In prior art lenses, corrections for astigmatism have been well cared for but this has been in spite of power errors of such magnitude that an appreciable blur has resulted. It has been found, however, by permitting moderate amounts of astigmatism to enter into the aberration of the lens which has power error, provided the errors are of equal value but opposite sign, considerably improvement in power error can be obtained. Also improvement in actuity is obtained. An astigmatic error of plus one-eighth diopter in one meridian and minus one-eighth diopter in the other will give a blur circle of only one-eighth diopter and will create little or no stimulus to accommodation. Furthermore, for negative lenses for correction of myopia, power errors present in a lens corrected for astigmatism are positive in value. It is a known fact that a person cannot accommodate negatively; that is, this positive power error blur cannot be accommodated for. It is, therefore, extremely important in minus prescriptions to reduce the power error even while introducing astigmatism in order to improve the quantity of infomation which is available for various angular fields of view.

Another condition in which prior art lenses have been deficient results from the fact that in attempting to optimize astigmatic errors, advantage has not been realized in the choice of different base curves. There is little to be gained by optimizing and maintaining a design to within 0.03 diopter aberration, for example, when by relaxing the ocular base curve tolerance, one can effect other objectives without introducing power errors or astigmatic errors beyond 0.08 diopters. No patient is sensitive to power changes of less than this small amount, so for rather weak lenses where good corrections are obtainable with a wide variety of ocular base curves, for a particular design criterion, be it power or astigmatism, and for a particular angle of viewing and a particular stop distance, there is still a wide variety of other criteria remaining to be corrected, and it is to these criteria that attention is directed.

Since the desired width of field of view varies with the uses to which the spectacle lenses are to be put, when various design criteria are satisfied, and other variables may be involved, it is sensible to examine the performance of a lens which is well corrected at a 30° field of view to seee what happens at a 40° field of view. There are many times when a wider field would be more desirable if acceptable acuity could also be had. On the other hand, since due to strength of prescription, for instance, good corrections are not obtainable even at 30°, it may be desirable to be able to direct attention to a 20° field of view. In short, for all but the strongest negative prescriptions of the series, a careful study of performance and attempts to balance the aberrations at 20°, 30° and 40° was made, weighing first those at 20 degrees so that for areas near the center of the lens, the most perfect vision will be obtained.

As mentioned previously, the stop distance varies with different individuals. Also the distance from the stop point SP to the front of the cornea is known to vary in individual eyes requiring the same prescription. Also, it is greater in the case of myopic eyes than it is in hyperopic eyes. In general, it has been assumed that this range of stop distances is 6.00 mm. and that somewhat longer and somewhat shorter distances may be encountered. Also we have assumed that from the mid portion of the prescription range, this distance lengthens as the lenses become more negative.

It is well-known that the greatest amount of visual discomfort arises when persons are viewing near objects, and, of course, it is at such distances at which persons must be equipped to work for long periods of time. Astigmatism at near object distances is a very annoying aberration if it is not cared for. On the other hand, insofar as power errors at near object distances are concerned, it can be seen that the distance from the lens to objects lying in a flat plane, for example, at 13 or 16 inches from the lens but at different oblique fields of view will vary greatly as compared with the distance to objects straight ahead. Therefore, it is meaningless to say that the lens is corrected for power at a selected near object distance. What is more feasible for the patient under such conditions is to have him arrange his work, reading matter or the like, so that power errors are not annoying at the selected near object distance and to have his lenses corrected for astigmatism at this distance. When so corrected for astigmatism, the lenses will be corrected within reasonable tolerances for astigmatism at object distances somewhat shorter and somewhat longer than this and for flat as well as curved object fields.

In evaluating a design for 0.3 to 0.4 meter object distance, astigmatism only is considered.

The power error, however, will vary greatly when one looks at 20° or 30° or 40° or straight ahead depending on whether the object is lying on a curve equidistant from the eye or in the flat plane normal to the straight-ahead line of sight.

Power errors at longer object distances, however, have been given serious consideration. It is felt that the average person wearing glasses relaxes his accommodation when necessary in order to see objects clearly while shifting his view from a straight-ahead point on a flat plane normal thereto to view an obliquely disposed area of this plane, such as an object at 20°, 30°, or even 40° to the straight-ahead line of sight. It is safe to assume that if a person uses a pair of perspective lenses in order to correct minor defects in vision or to enable him to see more clearly and easily, he still will relax his accommodation when needed. Therefore, and according to habit, power errors have been determined in such a way that a zero power error for a near object distance means that the contribution of the lens to the forms of the image will be the same for a flat plane for various fields of view as it is for the straight-ahead field of view.

For one meter object distances sagittal and tangential power errors at 20° deviation as well as acuity, including astigmatism and lateral color, have been computed using a range from 24 to 36 mm. stop distances in order to determine what design will best suit the needs of persons at this working distance. Also acuity and power errors for an infinite object distance, including 20°, 30° and 40° oblique fields of view have been computed while considering stop distances ranging from 24 to 36 mm. Furthermore, with reference to astigmatsim and acuity the computations included not only the two principal (prime and double prime) meridians of the toric lenses but in cases wherein astigmatic corrections are required the 45° meridians therebetween were also considered. In some cases, it has been found quite useful to be able to correct at the 45° meridian particularly where the patient's cylinder axis is at 45° or 135° locations.

To compute, compile and evaluate all the information for all fields of view, for all stop distances and for all aberrations being considered would require consideration of some two hundred and seventy different criteria in order to be able to decide upon the inside or ocular base curve to be used for each single prescription. It has been found from careful study of this data that a very good "profile map" of a given prescription, as it would perform with various base curve values, can be indicated upon bar-graph charts similar to those indicated in FIGS. 6 and 7. In these charts, approximately fifty-four carefully selected criteria have been included for two different selected prescriptions and plotted relative to a range of inside or ocular base curve values. The prescription of FIG. 6 is a plus 4.00 sphere power combined with a minus 2.00 cylinder power and the prescription of FIG. 7 is a minus 4.00 sphere power combined with a minus 2.00 cylinder power. One chart shows a range of inside base curves of sphere values from —2.00 to —8.00 and on the other values from —4.00 to —10.00 have been indicated in the horizontal direction and groups of criteria in the vertical direction. These charts will be more fully discussed hereinafter.

The computing, in order to select the inside base curve for the ocular side of the lens prior to the plotting on graphs and arranging in a series upon the charts, is based on the "true power" curve of the lens, the weaker meridian of a negative toric and it can be compared with standard curves by converting from the index 1.5232, which describes the dioptric value. The radius of this surface can be obtained by dividing the number 0.523 by the listed dioptric value. With this radius, by dividing this into the number 0.53, the dioptric value of standard commercial tools would result in a lens curve of the same performance. The true power values are here referred to because of their convenience for computing purposes. The true power curves are converted to standard tool values only at the final stage of the lens series design.

At times, the words "front base curve" may be used herein for convenience in referring to the finished or semi-finished lens blanks in commercial use of the series. For economy in inventory and distribution of such a series of lenses, a given front base curve value will be used over a variety of prescriptions, changing the prescription by moderately changing the inside toric surface as needed.

Throughout much of the Rx range already mentioned a general purpose lens series can be provided since the latitude in choice of front base curve for a particular criterion permits the inclusion of other criteria. However, in the case of strong cylindrical prescriptions and in the stronger negative portion of the series, there is required some compromise in quality. Good results can be obtained, however, if the lenses are designed for specific object distances, for a long or short stop distance and for one principal point of the toric or the others. In some instances, several criteria can be satisfied but seldom all of the criteria.

There is, therefore, indicated in the bar-graph charts of FIGS. 6 and 7, for example, which inside or ocular base curves are best for which purposes. The errors in power, astigmatism, and acuity including lateral color are computed in the manner already mentioned for various stop distances for 20°, 30°, and 40° for prescriptions in two diopter steps of sphere power from plus 8.00 to minus 8.00 and in four diopter steps from minus 8.00 to minus 20.00D. Computations were made for inside base curves varying according to the prescriptions and for each prescription, inside base curves of 1.50 diopters apart were selected. For each prescriptive sphere value (see Table AA), computations were made not only for the inside sphere values on the rear side of the lens but also for —2.00, —4.00 and —6.00 diopters of cylinder. The aberrations were then figured in quarter diopter steps in base curve values.

The aberration data obtained for each prescription was then sorted and arranged in transverse rows across as shown in the charts of FIGS. 6 and 7 in such a manner that one vertical column contained the data for one inside base curve and the next column the data for the next higher inside base curve. Each type of data for each angle of viewing was listed in three rows, one for each different stop distance. The data was also grouped by types of aberration (astigmatism, A; acuity blur, B; or power error, C). A high or primary acceptable tolerance at 20° field of view for astigmatism is 0.08D, for power error is 0.12D and for acuity is 0.10D. The acceptable high tolerance at 30° field of view for astigmatism is 0.12D and the high acceptable tolerance for acuity for 30° and 40° field of view are 25% of the minimum value obtainable in each row of data. At times, the above-mentioned high tolerances cannot be attained in which cases the astigmatic and power tolenances are increased in steps of 0.06D (except that the second astigmatic tolerance is 0.12D and increased in steps of 0.06D). At times the acuity factor cannot be brought below 0.10D, in which case the range is selected by selecting the minimum plus 25% of the minimum. The acuity factor is discussed above averages all points of the toric.

The charts of FIGS. 6 and 7 are work sheets resulting from the above arrangement of data for two different specified prescriptive values. On each of these two charts the short dash lines represent the data of primary tolerance for the shortest distance used, namely, a 24 mm. distance in FIG. 6 and a 27 mm. distance in FIG. 7 respectively, the solid lines representing the data of primary tolerance for the 27 mm. and 30 mm. stop distances in FIGS. 6 and 7 respectively and the long dash lines representing data of primary tolerance for the 30 and 33 mm. stop distances thereof respectively. These lines are drawn through those portions of the charts representing in each instance the base curve on the ocular side of the lens with which a lens may be manufactured which will adhere to the primary tolerances mentioned above for each criterion.

At the ends of many of these lines are wavy lines to indicate the ocular base curves through which the secondary tolerances may be met. Also on each of these lines a small circle is shown which represents the base curve value which will yield the optimum lens design for the criteria at the stop distance and angle considered.

It can be seen that no single inside base curve fits all criteria but that certain curves fit certain groups of criteria well. However, if Group I at the top of the "bar-graph"

chart of FIG. 6 or 7, is considered to be of top priority and Group II second in priority, etc., it is possible to provide a lens which will satisfy much of the priority listed in these charts. For example, in FIG. 6, a −5.00D base curve on the ocular side of the lens and a nominal +9.00D sphere curve on the front will provide this +4.00D sphere Rx curve with a −2.00D cylinder correction and will satisfy the primary criteria for the prime points of the toric for astigmatism (A) at all three stop distances. It will meet the secondary criteria at the double prime points and the primary criteria at the 45° points. Also for a 20° field of view and most stop distances, it will meet the primary or secondary power error criteria for a 1 meter object distance and for an infinite object distance. In almost meets all of the primary criteria for acuity at 20° and 30° field and barely misses the secondary criteria for acuity at the 40° field of view.

It can be seen that a base curve of approximately −4.50 would more nearly meet all of the criteria. It can also be seen that the astigmatism cannot be corrected for both the prime and the double prime points to satisfy the primary criteria for all stop distances for both 20° and 30°. This indicates the need and possibility for special purpose lenses where the patient's axis of the astigmatism is known so that one point of the toric may be corrected at the expense of the other in order to provide a better wide horizontal field where necessary.

If we adhere to the priority already given to the groups of criteria, averaging and optimizing over the range of stop distances indicated and between the prime, double prime and 45° points of the toric, the most favorable design for a general purpose lens series would have a minus 4.00D true power inside base curve. That is, the weaker meridian of the concave toric surface of this Rx +4.00D −2.00 cyl. lens would have a −4.00D power at 1.5232 index. Charts similar to those in FIGS. 6 and 7 for indicating the range of inside base curves for the various prescriptive requirements and with different stop distances can be constructed to care for the full range from +8.00 to −20.00 diopters.

It has already been indicated that a −4.00D true power inside base curve is the best choice, if all indicated priorities are adhered to. However, if a lens strictly for near work is to be designed with a wide horizontal field of view of good quality, correction of astigmatism should first be cared for. Also if the axis of the minus cylinder power of the lens is prescribed at 180 degrees (or horizontal) it would be best to correct the prime points of the toric. Accordingly, the top three lines in Group I of the proper chart (such as FIG. 6, if the prescription is a +4.00D sphere with −2.00 cylinder) would first be looked at for the 20° field of view, and then the top three lines in Group VI for the 30° field and select a base curve value which meets the primary criteria of both groups. We would see that a curve ranging between 5.3 and 6.3 diopters would satisfy primary tolerances for the prime points of the toric for astigmatism for near object distances and 24, 27 and 30 mm. stop distances. The double prime points can here be ignored.

If an elliptical field is to be cared for the double prime points would have to be considered also for tolerances. It would be determined whether at 20° the double prime points met the necessary tolerances. It can be seen from FIG. 6 (Group I) that the secondary tolerances of 0.10 to 0.12D are satisfied between 5.00 and 5.50D in the base curve range. If the tolerances at 30° field of view for the prime points and 20° field of view for the double prime points are both to be satisfied, a base curve value should be found wherein the errors for the prime points of Group VI approximately equal the errors for the double prime points in Group I. Such a curve will be found between 5.30 and 5.50D.

Such a curve would be at the left end of the primary tolerances for the prime points and for the double prime points at the right end, and the magnitude of the astigmatic errors in this case are approximately equal. Furthermore, there is little to be gained at 20° for the double prime points by attempting to use a base curve further to the left since the change in astigmatism is very insensitive to a change in base curve but for the prime points at 30° astigmatism gets worse rapidly with such a change in base curve values. In fact, in order to get into the primary tolerances for the double prime points at a 20° field for all three stop distances (Group I) would require a −3.15D base curve but this would result in too great an astigmatic error at the prime points.

Similarly, if acuity (B) is to be emphasized, which, of course, is of greater importance in lenses to be used at intermediate and far distances, a −3.75 to −4.25 base curve would substantially satisfy substantially all of the criteria shown in Group II of FIG. 6.

In the bar-graph chart of FIG. 7 are shown different base curve values for a prescription of −4.00D sphere combined with a −2.00D cylinder lens, it can be seen that no single base curve value will satisfy all of the criteria. However, if we are considering a general purpose series relative to the best selections of stop distances for different prescriptive requirements, it can be seen that the best base curve value to use for a patient having a long stop distance (33 mm.), that is, a base curve value which passes through most of the primary criteria, would be a −5.75D curve. In cases wherein the patient's stop distance is more nearly average (30 mm.), a lens with an inside base curve value of −6.25 would be best, and if the patient's stop distance is short (27 mm.), a −6.75 base curve value is preferred.

Figure 8:
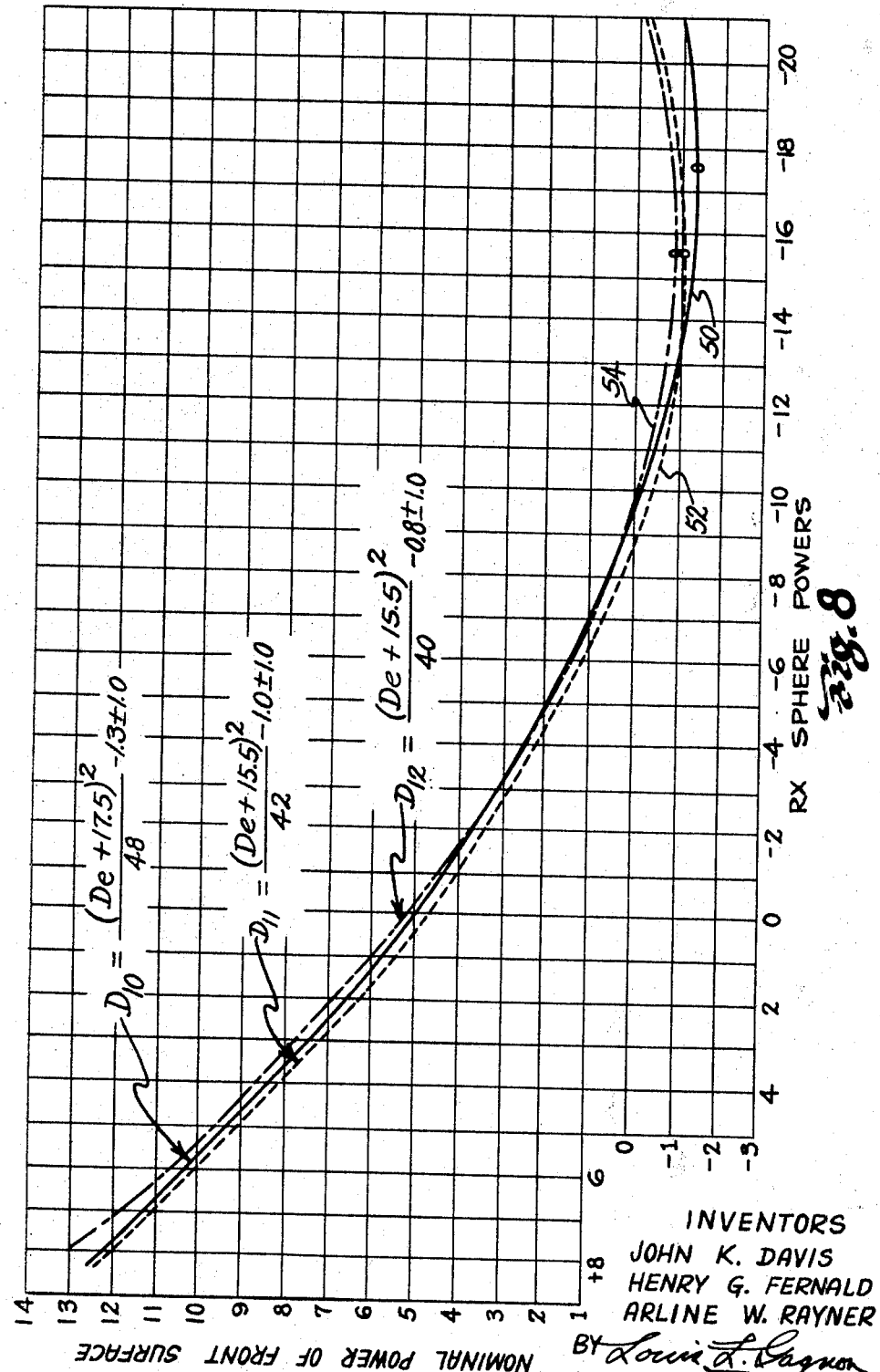
FIG. 8 is a graph for displaying ranges of nominal front curve values for a general purpose lens series.

Using a bar graph (generally similar to that disclosed in FIG. 6 or 7) for each of the various prescriptive requirements normally to be expected in the trade, a multiplicity of different lens series designs have been formulated, each design being related to the nomial front curves and prescriptive values for the combination of criteria which it is desired to satisfy; such as object distance, general purpose, special purpose, eye stop distance, average eye position, selected points on the toric, and average points on the toric, etc. Three such curves are shown in FIG. 8, one being shown as a solid line curve 50 for general purposes for sphere values solely, the second being shown as a short dash line curve 52 for general purposes for lenses of a minus two diopter cylinder value and the third curve being shown as a dot-dash line curve 54 for general purposes for lenses of a minus four diopter cylinder value.

For convenience in specifying the ranges and defining the general areas of the ocular base curves which fulfill the criteria for this series, the following equations have been developed and each mathematically defines not only the approximate front spherical base curve for the given power of sphere and cylinder but also the latitude which is allowable and which will meet the required and specified criteria.

The equation for the solid line curve $D_{10}$ is:

$$D_{10} = \frac{(De+17.5)^2}{48} - 1.3 \pm 1.0 \quad (17)$$

The equation for the short dash line curve $D_{11}$ is:

$$D_{11} = \frac{(De+15.5)^2}{42} - 1.0 \pm 1.0 \quad (18)$$

and the equation for the dot-dash line curve $D_{12}$ is:

$$D_{12} = \frac{(De+15.5)^2}{40} - 0.8 \pm 1.0 \quad (19)$$

and wherein $De$ is the prescriptive dioptric power. In this general purpose series, all of said aberrations have been considered and satisfied at the aforementioned object distances; namely 0.3 to 0.4 m., 1 m. and ∞. Also both short and long stop distances of differing values for near and distance criteria, respectively, were considered for three different regions of this series in the manner indicated in the following table:

TABLE B

| Region | Short Stop (Near), mm. | Long Stop (Distance), mm. |
| --- | --- | --- |
| +8.00D to 0.00 | 24–27 | 27–30 |
| 0.00 to −6.00D | 27–30 | 30–36 |
| −6.00D to −20.00D | 28–31 | 31–34 |

However, for accurate knowledge of the performance of a specific lens, it would be best to select its base curve value from the actual plots on the correct bar graph, such as shown in FIG. 6 or 7, rather than relying upon these equations, or by referring to a proper base curve selection table, such as the general purpose table which follows:

TABLE C

| Rx | Nominal Front Spheres Powers | | |
| --- | --- | --- | --- |
| | Cyl.=0.00 | −2.00 Cyl. | −4.00 Cyl. |
| +8.00 | 12.50 to 14.00 | 12.50 to 13.25 | 12.50 to 13.00 |
| +6.00 | 10.00 to 10.50 | 10.00 to 10.50 | 10.00 to 10.75 |
| +4.00 | 8.00 to 8.50 | 8.00 to 8.50 | 8.25 to 8.75 |
| +2.00 | 6.00 to 7.00 | 6.00 to 7.25 | 7.00 to 8.50 |
| 0.00 | 4.00 to 7.75 | 4.00 to 4.75 | 4.00 to 5.50 |
| −2.00 | 3.00 to 4.25 | 2.25 to 3.25 | 2.00 to 3.00 |
| −4.00 | 1.50 to 2.75 | 1.50 to 2.75 | 1.00 to 1.75 |
| −6.00 | 1.00 to 1.75 | 1.00 to 1.50 | 0.50 to 1.00 |
| −8.00 | +0.00 to +0.75 | +0.25 to +0.75 | +0.25 to +0.75 |
| −10.00 | +0.50 to −0.25 | +0.25 to −0.25 | −0.25 to −0.25 |
| −12.00 | −0.25 to −1.25 | −0.50 to −0.75 | −0.50 to −0.75 |
| −14.00 | −0.25 to −1.25 | −0.75 | −0.50 |
| −16.00 | −1.25 to −1.50 | −0.75 to −1.00 | −0.75 |
| −18.00 | −1.25 | −1.00 | −0.75 |
| −20.00 | −1.50 | −1.25 | −1.00 |

In this table, a full range of prescriptive sphere powers in two diopter steps from +8.00 to −20.00 have been given in a first vertical column and nominal front surface curvatures for zero, −2.00 and −4.00 cylinder powers given in the next three columns.

The three curves of FIG. 8 depict areas of usefulness for a general purpose series as already described, curve 50 being for sphere values only and curves 52 and 54 being for sphere values combined with cylinders of −2.00D and −4.00D respectively. These curves together with Table C will enable one skilled in the art to design a practical lens series which will satisfy all of the main criteria or considerations already described. All that is needed is to interpolate between the 0 and 2 cylinder values, and between the 2 and 4 cylinder values in Table C and compute the lens thickness needed and the inside curve according to methods well known in the art. In other words, knowing the proper range of nominal front curve values for certain selected purposes, in order to obtain a good lens series design that will satisfy these definite desired criteria, anyone skilled in the art of making spectacle lenses can compute the necessary thicknesses and ocular curves needed to yield the desired prescription.

Figure 9:
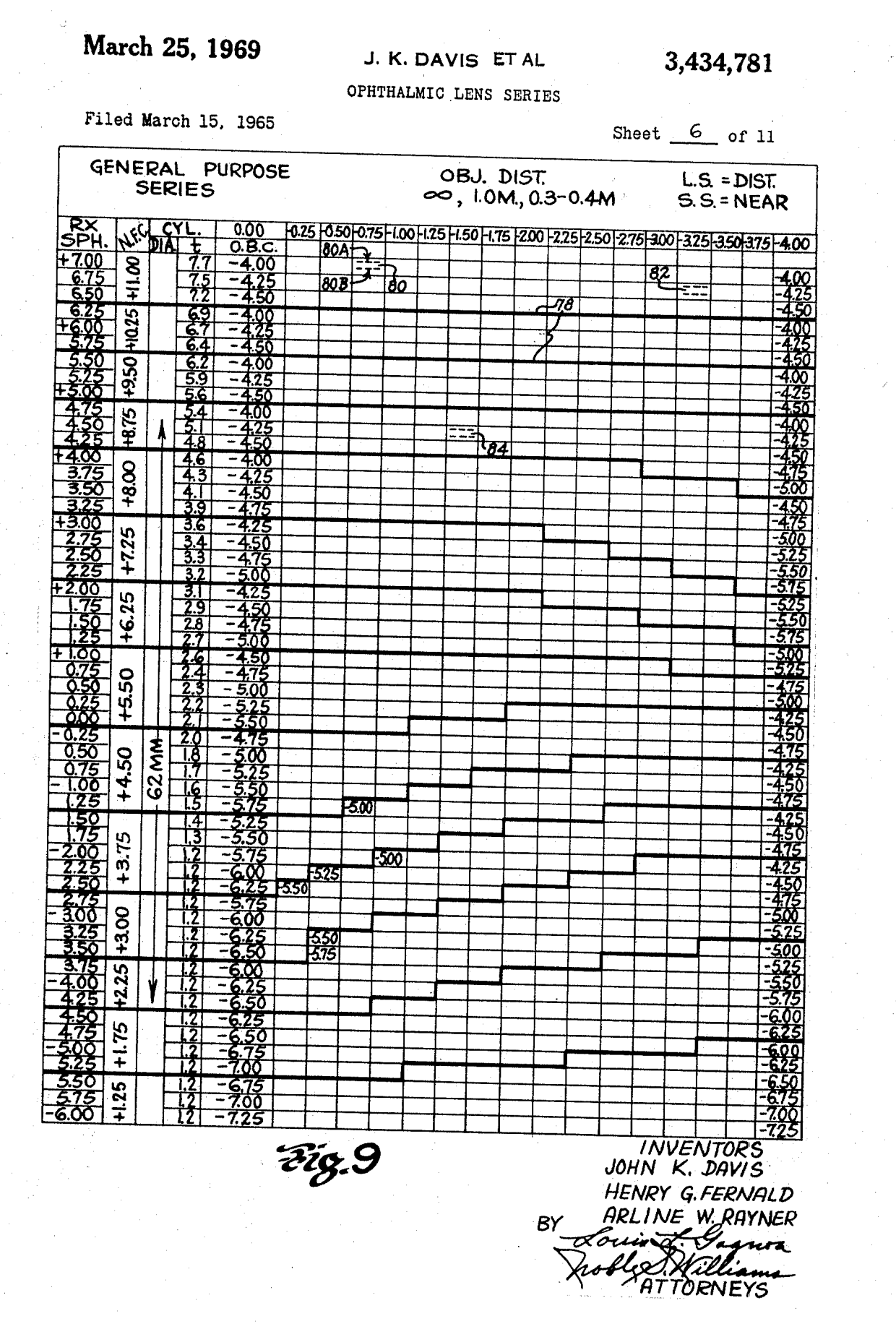

A compilation of such information is shown in a surfacing chart in FIG. 9, said chart being an example of a laboratory chart for grinding lenses of the said general purpose series wherein 14 different nominal front curve values for the series represented in FIG. 8 have been shown in vertically arranged spaces near the left-hand side of the chart so as to form a column which is designated NFC. To the left of this column of nominal front curve values is arranged a full column of Rx sphere values from +7.00D to −6.00D, and it will be noted that each nominal front value is arranged so as to be in a boxed-in area which is opposite several different adjacent Rx sphere values. A column marked t for thickness values and a column marked OBC for ocular base curve values are disposed to the right of the first-mentioned columns and each of these latter columns contains values opposite each value in the Rx sphere column, these values referring to standard commercially existing and stocked laboratory tools which have curvatures thereon computed for a 1.53 index glass and which are presently being used with commercially standardized 1.5232 glass.

Also, the chart shows by a column marked Dia. that in this particular instance the values being employed in the chart are intended for the production of lenses each having a 62 mm. diameter.

Near the top of this chart, a transversely extending space marked Cyl. is subdivided and provided with numbers to indicate fractional Rx cylinder values from 0.00 to −4.00D. Heavy lines 78 are arranged to extend generally transversely across the chart between each different adjacent pair of NFC values and thus divide the chart into 14 different large clearly defined areas beneath the Rx cylinder values mentioned above. Also finer horizontally and vertically extending lines subdivide each of these large areas into a plurality of smaller rectangular areas as indicated, for example, at 80 and 82. Thus, each small area is directly opposite one of the values in the OBC column and also directly beneath a fractional cyl. value.

Accordingly, in each small rectangle (and as is suggested by the dotted lines 80A and 80B), it is possible to provide two numbers to be used by a lab technician, the upper number 80A preferably indicating the spherical base curve value on the concave side of the lens and the lower number 80B indicating the cylindrical curve value on the same side of the lens. Accordingly, for the small area indicated at 80, the upper number would be −4.00D and the lower number would be this number plus the cylinder curve value or −4.75D. For the area 82, the upper number would be −4.25D and the lower would be −7.50D. In like manner, for area 84, the upper number would be −4.25D and the lower number would be −5.75D. Similarly, each of the many small areas on the chart would be provided with upper sphere numbers and lower cyl. numbers.

Table C2, which for convenience is in two parts (a) and (b), shows below in part (a) in the left hand column thereof the nominal front curve powers (much like those for FIG. 9), for a series of blanks with related radii for the ocular surface curvatures for producing Rx spherical prescriptions. Part (b) shows when these same nominal front curve sphere powers are combined with −2.00D cyl. and −4.00 cyl. prescriptions also.

TABLE C2(a)

| NFC Sph. | Rx Sph. | 0.00 cyl. | | | |
| --- | --- | --- | --- | --- | --- |
| | | OBC | $R_B$ | AFC | $R_F$ |
| +11.00 | +7.00 | −4.00 | 132.50 | +10.61 | 49.95 |
| +10.25 | +6.00 | −4.25 | 124.71 | +9.92 | 53.43 |
| +9.50 | +5.00 | −4.50 | 117.78 | +9.25 | 57.30 |
| +8.00 | +4.00 | −4.00 | 132.50 | +7.86 | 67.43 |
| +7.25 | +3.00 | −4.25 | 124.71 | +7.15 | 74.13 |
| +6.25 | +2.00 | −4.25 | 124.71 | +6.17 | 85.90 |
| +5.50 | +1.00 | −4.50 | 117.78 | +5.44 | 97.43 |
| +4.50 | 0.00 | −5.50 | 96.36 | +5.44 | 97.43 |
| +4.50 | −1.00 | −5.50 | 96.36 | +4.45 | 119.10 |
| +3.75 | −2.00 | −5.75 | 92.17 | +3.70 | 143.24 |
| +3.00 | −3.00 | −6.00 | 88.33 | +2.95 | 179.66 |
| +2.25 | −4.00 | −6.25 | 84.80 | +2.19 | 242.01 |
| +1.75 | −5.00 | −6.75 | 78.52 | +1.67 | 317.37 |
| +1.25 | −6.00 | −7.25 | 73.10 | +1.15 | 460.87 |

TABLE C2(b)

| Rx Sph. | −2.00 cyl. | | | | −4.00 cyl. | | | |
|---|---|---|---|---|---|---|---|---|
| | OBC/OCC | $R_B/R_C$ | NFC/AFC | $R_F$ | OBC/OCC | $R_B/R_C$ | NFC/AFC | $R_F$ |
| +7.00 | −4.00 | 132.50 | +11.00 | 49.95 | −4.00 | 132.50 | +11.00 | 49.65 |
| | −6.00 | 88.33 | +10.61 | | −8.00 | 66.25 | +10.61 | |
| +6.00 | −4.25 | 124.71 | +10.25 | 53.43 | −4.25 | 124.71 | +10.25 | 53.43 |
| | −6.25 | 84.80 | +9.92 | | −8.25 | 64.24 | +9.92 | |
| +5.00 | −4.50 | 117.78 | +9.50 | 57.30 | −4.50 | 117.78 | +9.50 | 57.30 |
| | −6.50 | 81.54 | +9.25 | | −8.50 | 62.35 | +9.25 | |
| +4.00 | −4.00 | 132.50 | +8.00 | 67.43 | −4.75 | 111.58 | +8.75 | 61.92 |
| | −6.00 | 88.33 | +7.86 | | −8.75 | 60.57 | +8.56 | |
| +3.00 | −4.25 | 124.71 | +7.25 | 74.13 | −5.00 | 106.00 | +8.00 | 67.43 |
| | −6.25 | 84.80 | +7.15 | | −9.00 | 58.89 | +7.86 | |
| +2.00 | −4.25 | 124.71 | +6.25 | 85.90 | −5.25 | 100.95 | +7.25 | 74.13 |
| | −6.25 | 84.80 | +6.17 | | −9.25 | 57.30 | +7.15 | |
| +1.00 | −4.50 | 117.78 | +5.50 | 97.43 | −5.25 | 100.95 | +6.25 | 85.90 |
| | −5.50 | 81.54 | +5.44 | | −9.25 | 57.30 | +6.17 | |
| 0.00 | −4.50 | 117.78 | +4.50 | 119.10 | −4.50 | 117.78 | +4.50 | 119.10 |
| | −6.50 | 81.54 | +4.45 | | −8.50 | 62.35 | +4.45 | |
| −1.00 | −4.75 | 111.58 | +3.75 | 143.24 | −4.75 | 115.58 | +3.75 | 143.24 |
| | −6.75 | 78.52 | +3.70 | | −9.75 | 54.36 | +3.70 | |
| −2.00 | −5.00 | 106.00 | +3.00 | 179.66 | −4.25 | 124.11 | +2.25 | 242.01 |
| | −7.00 | 75.71 | +2.95 | | −8.25 | 64.24 | +2.19 | |
| −3.00 | −5.25 | 100.95 | +2.25 | 242.01 | −5.25 | 100.95 | +2.25 | 242.01 |
| | −7.25 | 73.10 | +2.19 | | −9.25 | 57.30 | +2.19 | |
| −4.00 | −5.75 | 92.17 | +1.75 | 317.37 | −5.75 | 92.17 | +1.75 | 317.37 |
| | −7.75 | 68.39 | +1.67 | | −9.75 | 54.36 | +1.67 | |
| −5.00 | −6.75 | 78.52 | +1.75 | 317.37 | −6.25 | 84.80 | +1.25 | 460.87 |
| | −8.75 | 60.57 | +1.67 | | −10.25 | 51.72 | +1.15 | |
| −6.00 | −7.25 | 73.10 | +1.25 | 460.87 | −7.25 | 73.10 | +1.25 | 460.87 |
| | −9.25 | 57.30 | +1.15 | | −11.25 | 47.11 | +1.15 | |

In part C2(a), the first three columns indicate the nominal front curve sphere values (NFC), the Rx sphere values and the ocular base curve values (OBC) for lenses from +7.00 to −6.00. The next column headed $R_B$ indicates in millimeters, actual radial values for the rear base curves of the lenses in the sphere meridians thereof. The next column headed AFC indicates the actual front curve powers of the lenses based on a 1.53 standard index, and the last column headed $R_F$ indicates in millimeters the actual radial values of the spherical curves on the front surfaces of the lenses.

In part C2(b) somewhat similar information is given. However, four columns indicate values for spherical prescriptions to which −2.00 diopters of cyl. power have been added and four columns indicate like values for spherical prescriptions to which −4.00 diopters of cyl. power have been added. One of these four columns headed OBC/OCC gives both the ocular base curve power for the sphere meridian of the lens and the ocular cylindrical curve power for the other meridian. The next column marked $R_B/R_C$ indicates actual radial values for the sphere meridian and for the cylinder meridian. The next column thereafter marked NFC/AFC indicates above the line the nominal front curve values for sphere prescriptions to which −2.00 cyl. values are added and below the line the actual front curve values therefor based on a 1.53 standard index, and the fourth column marked $R_F$ indicates the actual front curve radii. Four similarly marked columns are also included to indicate such sphere prescriptions to which −4.00 cyl. values have been added.

For prescriptions of intermediate values of sphere and cylinder powers interpolation between adjacent given values may be used with a fairly high degree of accuracy.

For negative cylinder values beyond −4.00D, it is possible to compute by the methods already indicated or to extrapolate from the cylinder values already given approximate values, for example, for −5.00D cyl. and −6.00 D cyl. powers respectively.

It is, therefore, an easy matter for a technician, knowing the Rx values of the doctor's prescription, to select from the chart the proper semi-finished lens blank adjacent the Rx sphere value of the prescription. Using this blank having the correct nominal front curve value thereon and obtaining from the chart the proper axial thickness and ocular base value transversely aligned with the Rx sphere value, and using the doctor's Rx cylinder value, a sphere or toric surface is generated on the rear face of the blank. When such procedure is followed, the resulting lens will satisfy the design criteria already mentioned.

More specifically, if a general purpose lens having a +4.00D Rx spherical power and a −2.00D Rx cylinder power is to be generated and is to be well corrected for all of the criteria already mentioned, the technician would select from the chart of FIG. 9 a blank having a nominal front curve value of +8.00D and using an axial thickness of 4.6 mm. would generate on the ocular face thereof a toric curve having a −4.00D base curve value and a −2.00D cylinder value. In like manner, if a +4.25 sphere power and a −2.00 cylinder prescription is to be made, a +8.75 blank would be selected and a −4.50D ocular base curve and a −2.00 cylinder value would be generated on the rear side in such a manner that the resulting toric lens would have an axial thickness of 4.8 mm.

In parts of the chart of FIG. 9, it will be seen that the heavy transverse lines separating adjacent NFC areas is "stepped" so as to include or exclude certain ocular base curve values relative to nominal front curve values and thicknesses; the first of these stepped lines being between nominal curve values +8.00 and +8.75. Thus, from FIG. 9, it will be evident that while a nominal front curve of +8.00 may be used with a +4.00 sphere value, a thickness of 4.6 mm. and a cylinder value of −2.75, for example, a cylinder value of −3.00 cannot be used successfully. The finished lens will not meet the specified tolerances. However, if a blank having a +8.75 nominal front curve value is used and a −4.75 sphere used as the ocular base curve value at 4.6 mm. thickness, a −3.00D cylindrical power can also be applied thereto with acceptable results.

While fourteen different nominal front curve values have been indicated in the NFC column of the chart of FIG. 9, it will be appreciated from the preceding discussion that the true power of each of these blanks will be of a slightly different value.

As has been previously mentioned, the curves indicated in FIG. 9 are based on the common usage of 1.53 tools for the ocular base curves. However, in order that this discussion be perfectly clear, the developing of the formula and examples which explain the significance of the nominal front curve and its departure from labeled values, we will first discuss this computation in terms of true power tools (index 1.5232) and then, add the practical considerations involved in using 1.53 tools which are those now in standard commercial use. For example, in the first column of FIG. 9, an Rx sphere power of +6.00D indicates that a blank of a nominal front curve power of +10.25D should be used with an ocular base curve of −4.25D on the rear surface of the resulting lens and should be spaced a thickness 6.7 mm. therefrom. The true power $D_1$, however, for such a front curve may easily be determined from these known values when desired, by the following formula:

$$D_1 = \frac{1}{\frac{1}{De - D_2} + \frac{t}{n}} \quad (19a)$$

wherein $De$ is the prescription sphere power of the lens, $D_2$ is the sphere power of the ocular base curve of the lens, $t$ is the axial thickness thereof and $n$ is the refractive index 1.5232; and for the above example, $D_1$ is equal to +9.81D.

Now considering the same example with an ocular base curve having, in commercial terminology, a (1.53) power of −4.25D, the −4.25 must be converted to radius by the following formula:

$$R_2 = \frac{(n-1)}{D_2} \quad (19b)$$

resulting in a radius $R_2$ of 0.12471 meters or 124.71 millimeters. This then has to be converted to true power in order to be used in the formula $$D_2 = \frac{(n-1)}{R_2}$$

resulting in a (1.5232) $D_2$ of −4.1954D. Using this value of 4.1954, in the Formula 19a for arriving at the nominal front curve with the index of 1.5232 and a thickness of 6.7 mm., we arrive at a $D_1$ (1.5232) of +9.76D or by the appropriate formula for radius $R_1$, a radius of 53.17 millimeters.

This discussion, therefore, shows that if a +6.00D spherical power is desired to be ground with a conventional standard tool −4.25 (1.53), the radius of the front surface of the semi-finished blank should be 53.617 millimeters. There is another practical consideration which must enter into the calculation of these nominal front curves which derives from the fact that said front curves are to be used for prescription lenses with cylinder values as well as sphere values. Inasmuch as standard (1.53) tools are used which do not accurately result in the labeled power, all lenses with cylindrical powers when finished in prescription laboratories have slight errors in their cylinder values. It is common practice to distribute these errors in both the sphere and cylinder meridians of the lens in order that the resultant error in each meridian be so small that the departure from the prescription will be negligible. It can be understood that if one meridian of the lens were corrected perfectly by computing the exact value for the nominal front curve based only on that meridian, the other meridian would have all of the error attributed to the difference between the 1.53 value of the cylinder and the 1.5232 value of the cylinder. Therefore, it is common practice to compute the radius of the nominal front curves so that this error is balanced between the two meridians as mentioned above. For example, using the formulas already described, the following mathematical operations for the sphere meridian and the cylinder meridian clearly indicate how the errors are balanced between the two meridians and how the exact radius in millimeters for a nominal front curve value is derived:

Rx=+6.00D=−2.00D Cyl.
GRINDING INSTRUCTIONS INDICATED BY CHART
Grind:
$$\frac{10.25D \text{ Nominal Base}}{-4.25D \times -6.25D}$$
$t$=6.7 mm.

|  | Sphere Meridian | Cyl. Meridian |
| --- | --- | --- |
| $De$ | +6.00D | +4.00D |
| $D_2$ (1.53) | −4.25D | −6.25D |
| $D_2$ (1.5232) | −4.1954D | −6.1698D |
| $R_2$ | 124.71 mm. | 84.80 mm. |
| $n$ | 1.5232 | |
| $t$ | 6.7 mm. | |
| Exact $D_1$ | +9.76D | 9.73D |
| $D_1$ (1.5232) (average) | 9.75D | |
| $R_1$ (for average error) | 0.05368 meters or 53.68 mm. | |

The illustration considers only one prescription of the entire group of prescriptions which may be ground from the blank the nominal front curve power of which is +10.25D. In design practice, similar computations are performed for all of the extreme usages both in sphere and cylinder powers for which said blank is to be used and a value of curve is selected to minimize the errors in both meridians of the resultant prescriptions for the said extremes and for prescriptions lying between said extremes.

Figure 10:
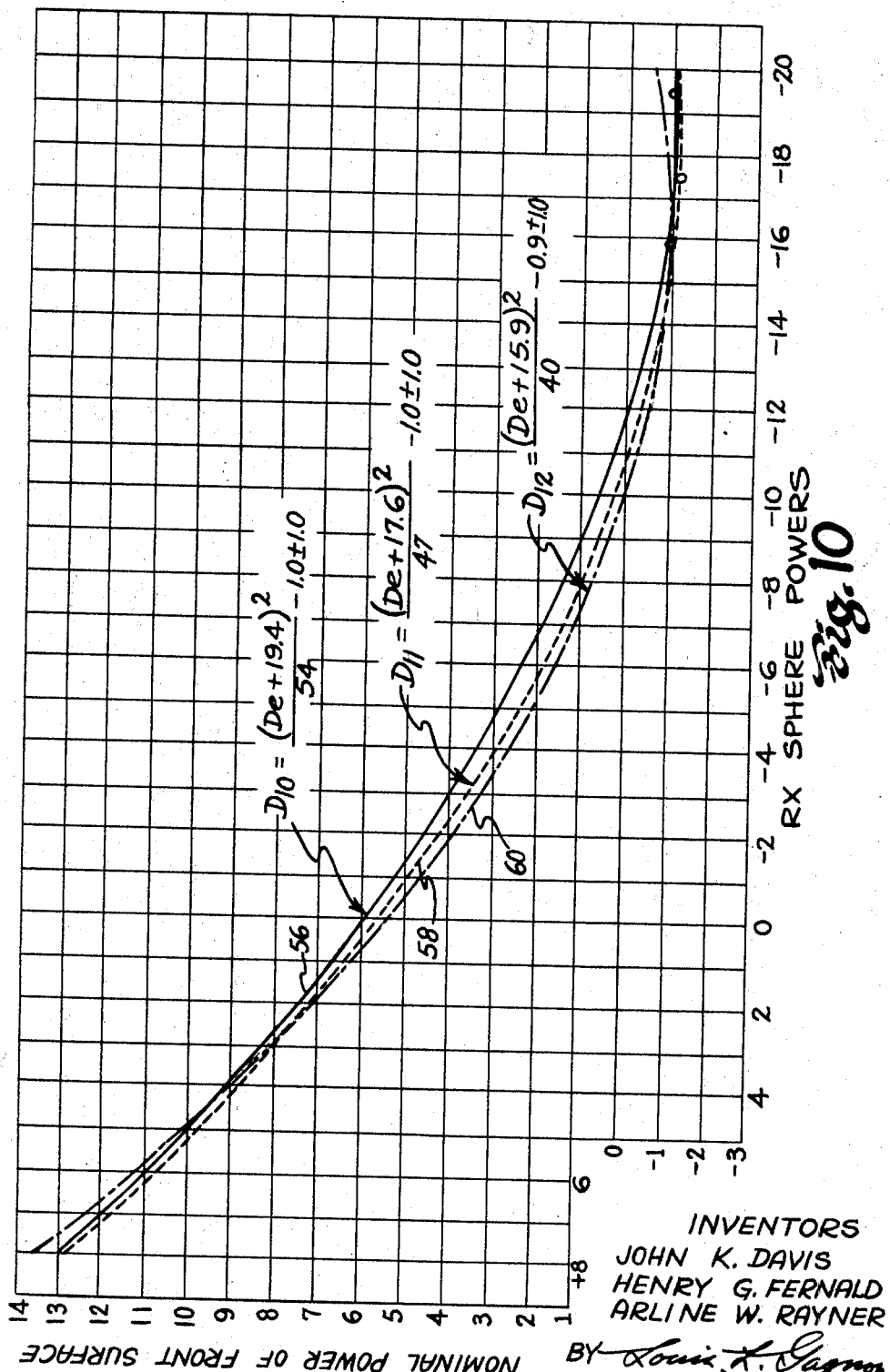
FIGS. 10, 11 and 12 are graphs for displaying ranges of nominal front curve values for two different lens series modified for selected purposes.

It is also interesting to compare the set of general purpose curves of FIG. 8 with other sets of generally similar curves but based on different design criteria to see how sets differ. In FIG. 10, for example, there is shown a second set of curves 56, 58 and 60 for a general purpose series but in which all criteria have been considered with reference to short stop distances only. Solid line curve 56 is for nominal front curve values and may be defined by the following equation:

$$D_{10} = \frac{(De+19.4)^2}{54} - 1.0 \pm 1.0 \quad (20)$$

Dash line curve 58 is for sphere powers combined with −2.00D of cylinder power and may be defined by the following equation:

$$D_{11} = \frac{(De+17.6)^2}{47} - 1.0 \pm 1.0 \quad (21)$$

Dot-dash line curve 60 is for sphere powers combined with −4.00D of cylinder power and may be defined by the following equation:

$$D_{12} = \frac{(De+15.9)^2}{40} - 0.9 \pm 1.0 \quad (22)$$

In the plus region of this series for values for +8.00 to zero, a 24 mm. stop distance has been used, in the negative region from zero to −6.00D a 27 mm. stop distance was used and in the strongly negative region from −6.00D to −20.00D a 28 mm. stop distance was used. The nominal front curve values given by these curves provide lenses having, generally speaking, the steepest curvatures and, accordingly, while useful for short stop values, this set of curves would be less preferred than those of FIG. 8 when long stop distances are encountered.

Figure 11:
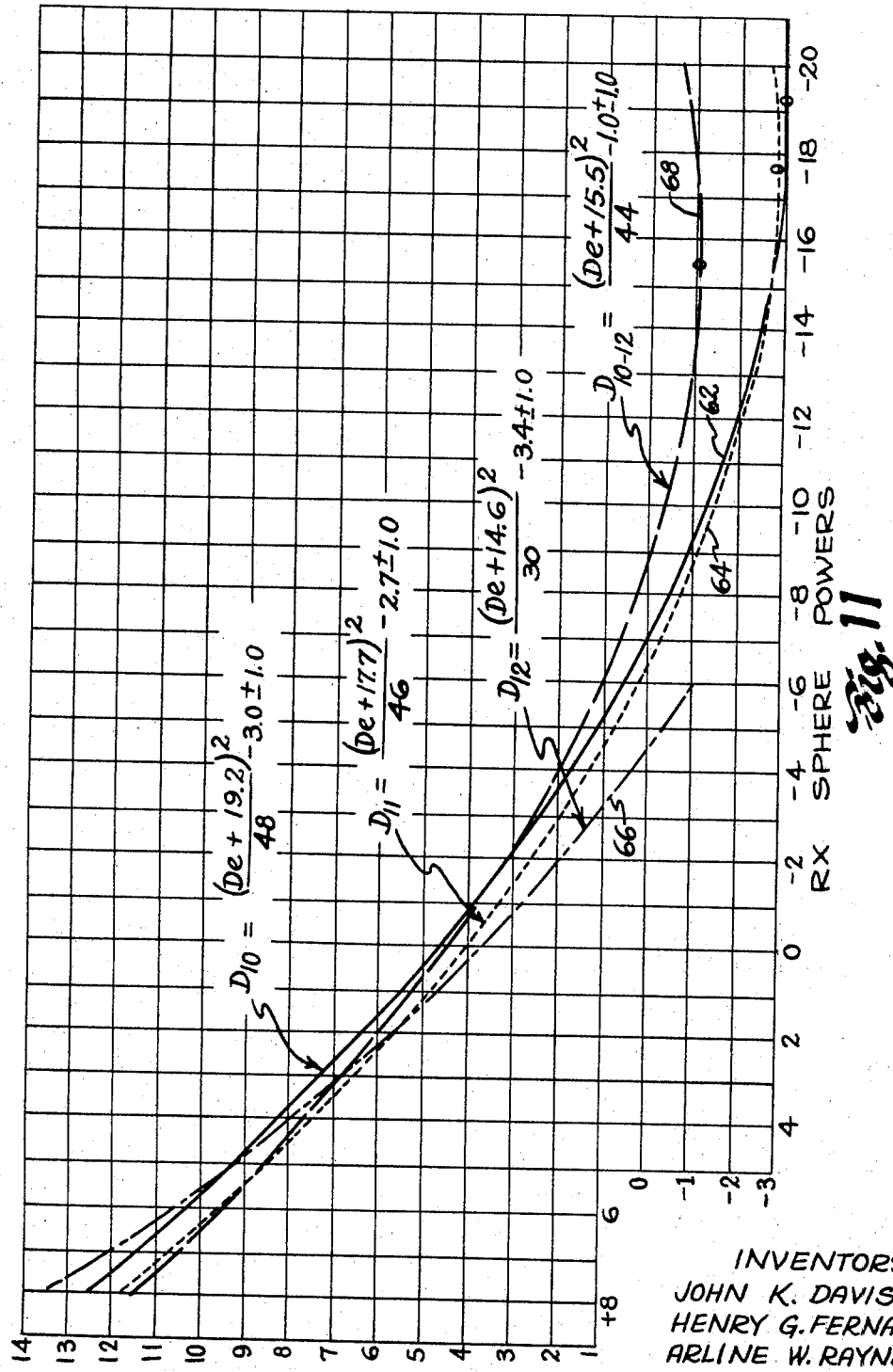

In FIG. 11, four additional curves 62, 64, 66, and 68 have been shown. Three of these cures, 62, 64 and 66, constitute another set for nominal front curve values particularly suited for near object distances from 0.3 and 0.4 of a meter only. Accordingly, astigmatism at these near object distances is the only criteria which has been considered. It will be noted that long stop distances have been found to be preferable, 30 mm. being employed for sphere values from +8.00D to zero, 36 mm. being used for sphere palues from zero to −6.00D and 34 mm. used for values from −6.00D to −20.00D. One exception exists, however, and this is for strong negative sphere values combined with −4.00D cylinder power. These values have been omitted from FIG. 11 since same will not meet the aforementioned tolerances for astigmatism. Curves 62 and 64 are the flattest curves in the minus part of the series. Curve 62 can be defined by the following equation:

$$D_{10} = \frac{(De+19.2)^2}{48} - 3.0 \pm 1.0 \quad (23)$$

Curve 64 can be defined by the following equation:

$$D_{11} = \frac{(De+17.7)^2}{47} - 2.7 \pm 1.0 \quad (24)$$

And curve 66 can be defined by the following equation:

$$D_{12} = \frac{(De+14.6)^2}{30} - 3.4 \pm 1.0 \quad (25)$$

Additionally, shown for comparison purposes upon FIG. 11, is a curve 68. This curve 68 gives nominal front curve values for a lens series particularly intended for use at a 1.0 meter object distance and has used long stop values in all parts of the series; 30 mm. being used for the plus region from +8.00D to zero, 36 mm. used for negative part thereof from zero to −6.00D and 34 mm. for the negative part thereof between −6.00 and −20.00D. It is interesting to note that this curve, which may be defined by the following equation:

$$D_{10-12} = \frac{(De+15.5)^2}{44} - 1.0 \pm 1.0 \quad (26)$$

and which equation will apply not only for the Rx sphere powers but also for the −2.00D and −4.00D cylinder powers is substantially the flattest curve to be had in the plus regions of the series. The nominal power values provided by this curve for a 1.0 meter object distance will, in most cases, satisfactorily care for the astigmatism at near, acuity at 1.0 meter and infinity as well as the power errors at the prime points only of the lenses.

While optimum base curve values in two diopter steps for prescriptive sphere power values alone, for prescribed sphere values combined with a −2.00D cylinder value and for prescribed sphere values combined with a −4.00D cylinder value have been indicated by curves 56, 58 and 60 in FIG. 10 for a general purpose series using short distances only, a more complete evaluation of this series can be had by referring also to the following table of values wherein allowable limits or departures from these optimum values are given:

TABLE D

| Rx | Nominal front sphere powers | | |
|---|---|---|---|
|  | 0.00 Cyl. | −2.00 Cyl. | −4.00 Cyl. |
| +8.00 | +13.00 | +12.50 to +13.25 | +12.75 to +13.50 |
| +6.00 | +10.50 to +11.25 | +10.50 to +11.00 | +11.00 to +11.25 |
| +4.00 | +8.75 to +9.75 | +8.75 to +9.00 | +9.00 to +9.25 |
| +2.00 | +6.75 to +7.75 | +7.25 to +7.50 | +7.00 to +9.00 |
| 0.00 | +2.50 to +7.00 | +5.50 to +7.50 | +5.00 to +5.50 |
| −2.00 | +2.25 to +5.50 | +3.75 to +4.75 | +2.75 to +3.25 |
| −4.00 | +3.50 to +4.00 | +2.75 to +3.00 | +2.25 to +2.75 |
| −6.00 | +2.25 to +3.00 | +1.75 to +2.25 | +1.25 to +1.75 |
| −8.00 | +1.00 to +1.50 | +0.75 to +1.00 | +0.50 to +0.75 |
| −10.00 | +0.50 to +0.75 | 0.00 to +0.25 | 0 |
| −12.00 | 0 | −0.25 | −0.25 to −0.50 |
| −14.00 | −0.50 | −0.75 | −0.75 |
| −16.00 | −0.75 | −0.75 to −1.00 | −0.75 to −1.00 |
| −18.00 | −1.00 | −0.75 to −1.00 | −0.75 to −1.00 |
| −20.00 | −1.25 | −1.00 | −0.50 to −0.75 |

In like manner the following table of values may be used together with curves 62, 64, and 66 in FIG. 11 as indications of the location and lateral range of values which can be used with this series particularly adapted for use at near object distances:

TABLE E

| Rx | Nominal front sphere powers | | |
|---|---|---|---|
|  | 0.00 Cyl. | −2.00 Cyl. | −4.00 Cyl. |
| +8 | +12.25 to +14.50 | +12.00 to +14.00 | +13.50 |
| +6 | +8.75 to +11.00 | +9.00 to +10.75 | +10.50 to +110.0 |
| +8 | +6.75 to +8.50 | +7.25 to +7.75 | +7.75 to +11.25 |
| +2 | +4.50 to +7.50 | +5.00 to +8.00 | +5.75 to +6.75 |
| 0 | +2.50 to +9.00 | +2.50 to +9.00 | +3.50 to +9.00 |
| −2 | +2.00 to +4.50 | +2.00 to +2.75 | +1.75 to +2.50 |
| −4 | +0.50 to +2.25 | +0.25 to +1.00 | +0.25 to +0.50 |
| −6 | +0.75 to +0.50 | +0.25 to −0.25 | −0.75 to −1.00 |
| −8 | −0.25 to −0.75 | −0.75 |  |
| −10 | −1.00 to −1.25 | −1.25 to −1.50 |  |
| −12 | −1.50 to −2.00 | −1.75 to −2.00 |  |
| −14 | −2.00 to −2.50 | −2.00 to −2.50 |  |
| −16 | −2.00 to −3.00 | −1.50 to −2.75 |  |
| −18 | −2.50 to −3.00 | −2.50 to −3.00 |  |
| −20 | −3.00 to −3.25 | −2.50 to −3.00 |  |

Also indicated in FIG. 11 is a curve 68 giving front sphere curve values for a lens series which is particularly adapted for use at a 1.0 meter object distance. As stated previously, only long stop values have been considered. Although substantially the same nominal front curve values may be used for Rx sphere powers with no cylindrical correction as well as for sphere powers to which −2.00D and −4.00D cylinder corrections have been added, nevertheless, the lateral limits for nominal front curve power values vary somewhat and are given in the following table:

TABLE F

| Rx | Nominal Front Sphere Powers | | |
|---|---|---|---|
|  | 0.00 Cyl. | −2.00 Cyl. | −4.00 Cyl. |
| +8.00 | +11.00 to +11.75 | +10.50 to +12.50 | +11.00 to +14.00 |
| +6 | +8.75 to +10.25 | +8.75 to +10.00 | +8.75 to +10.25 |
| +4 | +6.50 to +9.75 | +6.50 to +7.50 | +6.50 to +9.00 |
| +2 | +4.50 to +9.50 | +4.50 to +9.50 | +4.50 to +9.50 |
| 0 | +2.50 to +7.50 | +2.50 to +7.50 | +2.50 to +7.50 |
| −2 | +1.50 to +7.00 | +1.50 to +7.00 | +1.50 to +7.00 |
| −4 | +1.00 to +3.25 | +1.00 to +2.25 | +1.00 to +3.25 |
| −6 | +0.25 to +1.75 | +0.25 to +1.75 | +0.25 to +1.75 |
| −8 | 0.00 to +1.00 | 0.00 to +1.00 | 0.00 to +1.00 |
| −10 | +0.25 to −0.75 | +0.25 to −0.75 | +0.25 to −0.75 |
| −12 | −0.25 to −1.00 | −0.25 to −1.00 | −0.25 to −1.00 |
| −14 | −0.75 to −1.25 | −0.75 to −1.25 | −0.75 to −1.25 |
| −16 | −0.50 to −1.25 | −0.50 to −1.25 | −0.50 to −1.25 |
| −18 | 0.00 to −1.00 | 0.00 to −1.00 | 0.00 to −1.00 |
| −20 | −0.50 to −0.75 | −0.50 to −0.75 | −0.50 to −0.75 |

Thus, it will be seen from the foregoing description that by careful consideration of the many criteria mentioned above and with due consideration as to the individual conditions of use to be cared for that an improved negative toric lens series covering a range of sphere powers from +8.00D to −20.00 and cylindrical powers from 0.00 to −4.00 may be provided.

It has been found that the improved lens series can be designed with long stop distances for near vision (0.3 meter) uses and as such can still meet other desired criteria fairly well, and while having the series reasonably well corrected for short stop distances for both the prime and double prime points thereon.

Figure 12:
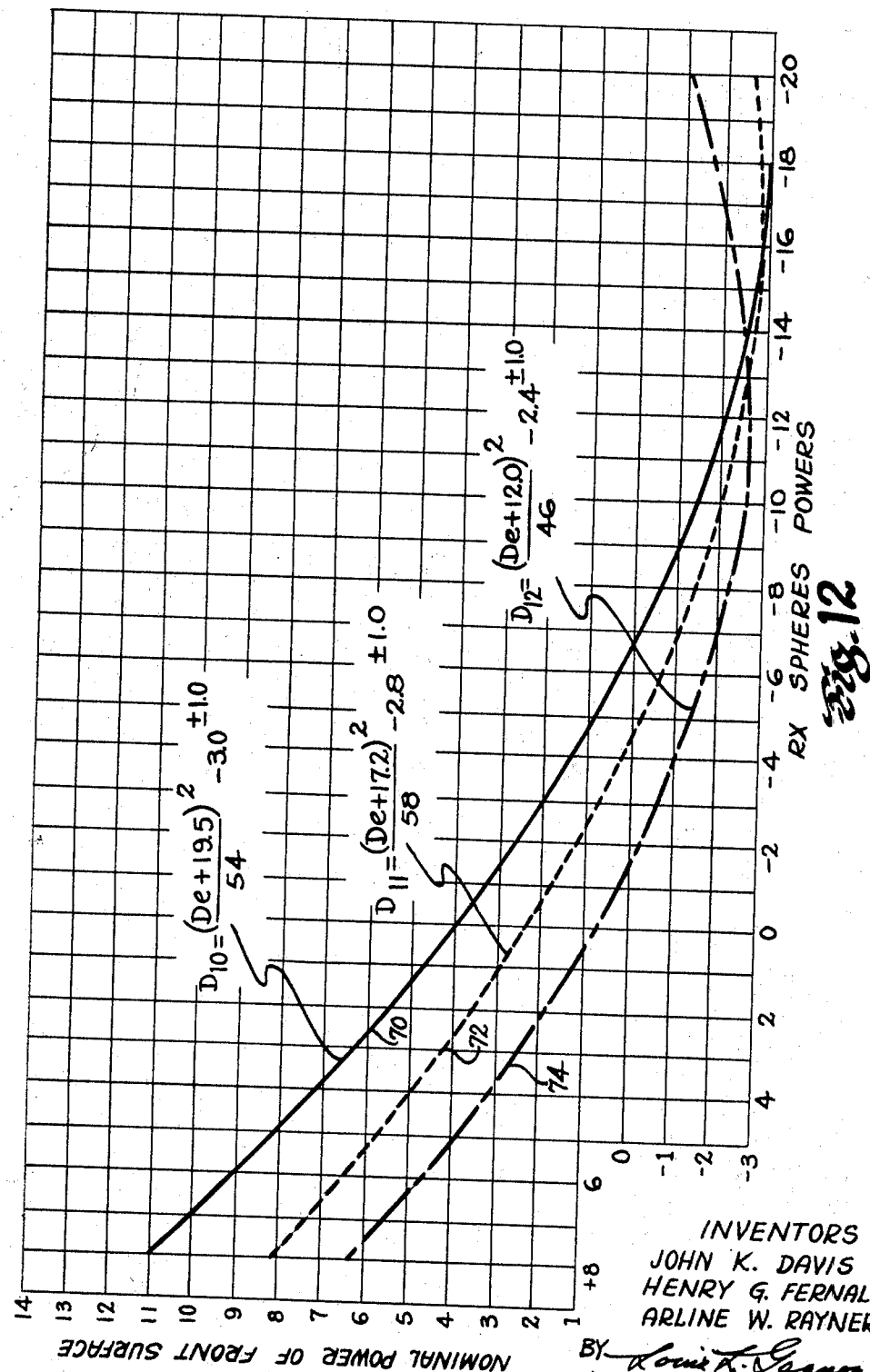

Curves 70, 72 and 74 in FIG. 12 show respectively nominal front curve values for R$x$ sphere values alone and also when combined with −2.00D and −4.00D cylinder values. Long stop distances of 27–30 mm. in the positive region of the series were used while 30–36 mm. and 31–34 mm. distances were used, respectively, in the 0 to −6.00D and the −6.00 to −20.00D regions thereof.

The equation for curve 70 is as follows:

$$D_{10} = \frac{(De+19.5)^2}{54} - 3.0 \pm 1.0 \quad (27)$$

The equation for curve 72 is as follows:

$$D_{11} = \frac{(De+17.2)^2}{58} - 2.8 \pm 1.0 \quad (28)$$

and the equation for curve 74 is as follows:

$$D_{12} = \frac{(De+12.0)^2}{46} - 2.4 \pm 1.0 \quad (29)$$

The following table indicates lateral ranges of values which have been found to be acceptable for these curves of FIG. 12:

TABLE G

| R$x$ | Nominal Front Sphere Powers | | |
|---|---|---|---|
| | Cyl.=0.00 | Cyl.=−2.00 | Cyl.=−4.00 |
| +8.00 | +12.25 to +14.25 | +7.50 to +8.75 | +3.00 to +6.25 |
| +6.00 | +8.75 to +11.00 | +5.00 to +6.75 | +1.00 to +5.00 |
| +4.00 | +6.25 to +8.50 | +2.50 to +5.00 | +2.00 to +10.25 |
| +2.00 | +4.00 to +7.50 | +3.50 to +10.50 | −2.75 to +9.25 |
| 0.00 | −2.00 to +10.00 | +2.50 to +10.00 | +1.75 to +3.75 |
| −2.00 | +1.00 to +3.50 | +0.50 to +2.00 | +0.25 to −0.50 |
| −4.00 | +0.25 to +1.50 | −0.50 to +0.50 | −0.75 to −1.25 |
| −6.00 | −0.25 to +0.50 | −0.50 to −1.00 | −1.25 to −2.00 |
| −8.00 | −0.25 to −0.75 | −1.00 to −1.50 | −1.75 to −2.50 |
| −10.00 | −1.50 | −2.00 | −2.50 |
| −12.00 | −1.75 to −2.50 | −2.25 to −2.75 | −2.25 to −3.00 |
| −14.00 | −2.50 | −2.50 | −2.25 |
| −16.00 | −2.50 to −3.25 | −2.25 to −2.75 | +0.25 to −2.50 |
| −18.00 | −3.00 | −2.00 | −1.75 |
| −20.00 | −2.75 to −3.25 | −0.75 to −2.25 | −1.00 to −3.00 |

The curves of FIG. 12 are substantially the flattest curves which would be called for when designing for the double prime points of the toric lens for long stop positions. These lenses would have only limited use, however, for persons with special needs but nevertheless they help show the range of useful values which can be obtained. These designs which emphasize the correction of astigmatism at the double prime points of the toric only and for long stop positions only and for a 0.3 meter object distance only have little use for other purposes, excepting that power at one meter for the double prime points is also somewhat corrected.

From the foregoing, it will be appreciated that a lens series design for best results must select which of the mentioned aberrations are to be corrected for and which criteria, such as angle of view, stop distance, object distances, points of the toric, etc., are the most important for the uses to which the lenses of the series are to be put. It would be too difficult and space-consuming to present in detail here all of the data which has been investigated for the above information. However, FIGS. 6 and 7, which are bar-graphs for two different prescriptive requirements and typical of the large number of other bar-graphs which have been compiled for evaluation of the lens series, quickly show that astigmatism corrections yield, in general, steeper base curves than corrections for power error or for acuity. They also show that for all of the aberrations considered, short stop distances provide steeper curves than do long stop distances. On the other hand, the correction of aberrations for nearer object distances always results in flatter curves than for distant object distances, whether the aberration be power error, astigmatism or acuity.

A study of the calculations indicates that there are many useful designs possible with considerably flatter base curves than heretofore. Examination of the plots, equations and bar-graphs would indicate that, in general, a lens series designed for short stop distances and for astigmatism only at the prime points of the toric would result in a steeper series of curves. However, a lens series designed for a short stop distance and near object distance without considering other criteria, would have unnecessarily steep curves, and by considering the other criteria for short stop distances and for other object distances, a general purpose series (see FIG. 10) will be found which is still well corrected for astigmatism for near object distances.

In general, a lens series designed for the double prime points only and for power, or astigmatism, would result in the flattest of ocular base curves. This would be particularly true if long stop distances were emphasized. An examination of FIG. 6 indicates that the ideal lens for astigmatism at the double prime points of the lens for a near object distance would have an ocular base curve flatter than −2.00 D. (Such lens with −2.00 D. cylinder value is indicated at 72 in FIG 12.) However, such a lens would be of little use in any other respect and, as can be seen by departing from this ideal value on the chart of FIG. 6, other points of the toric are greatly improved as well. Also these are improved with respect to other aberrations.

In between these two extremes of steepest curves of FIG. 10 and flatest curves of FIG. 12, a wide variety of series design choices are available, with their nominal base curve values departing to a greater or lesser degree from the corresponding base curve values of the general purpose series of FIG. 8.

It has already been pointed out that, wherever possible, the primary tolerances have been adhered to. Also, it is pointed out that for strong prescriptions, it is not always possible to adhere to these tolerances. Thus, in certain instances, secondary and even tertiary tolerances have been listed. An examination of the errors which have been obtained in lenses of designs according to this invention indicates that these primary, secondary and variable tertiary tolerances may as conveniently be expressed in percentage values relative to the individual prescriptions which are being considered. For example, it has been found that the aberrations which are listed for the 20-degree field of view can be held in most cases to a value not exceeding substantially five percent of the prescriptive power of the lens considered in its strongest meridian, and that, at the same time, the aberrations which are considered for a 30-degree field of view can be held in each case to a value not exceeding substantially eight percent of the prescriptive power of the lens considered in its strongest meridian and that at a 40-degree field of view, the aberration can be held to a value within substantially ten to twelve percent of the prescriptive power of the lens considered in its strongest meridian. It has also been found that while the criteria for 20 and 30 degrees often allow a wide choice of base curve selections, criteria for 40 degrees restricts the selection even for very weak prescriptions.

In the preceding part of this specification, the letter $v_1$ has been used to indicate the axial distance from the ocular vertex 16 of the lens to the cornea point 18, and the letter $v_2$ has been used to indicate the axial distance from the cornea point 18 to the stop point, SP, within the eye. Also these two axial distances when considered together have been referred to as the stop distance. In FIG. 13, it will be seen that the stop distance is indicated by the letters SD and the distances $v_1$ and $v_2$ have been indicated by the letters VD and SCD since same are sometimes referred to as the vertex distance and the sighting center distance, respectively.

Furthermore, it has been pointed out previously in a rather broad manner that the stop distances desired for persons with different types of eyes and for different desired object viewing distances cover a range of values which may extend from as little as 24 mm. to as much as 36 mm. In FIG. 13, curved dotted outlines 80 and 82 suggest eye sizes smaller and larger than normal, such as for patients having hyperopic and myopic eye conditions respectively. Of course, the location of the stop point SP within the eye in such instances would be correspondingly axially shifted somewhat and thus the sighting center distances, SCD, for these different conditions, will also change appreciably. A range of different possible rear surface locations for the lens 10 for different corrective requirements is suggested by dotted lines 84 and 86.

Many actual measurements of the sighting center distance, SCD, under various different conditions of use of the eyes of many different individuals now indicate that this distance varies materially as between different patients. In FIG. 14, wherein an elevational view of an eye is schematically shown, the "solid" outline 88 shows the eye when looking in a forward direction while the "dash" outline 89 shows the eye when tilted downwardly somewhat. Actual measurements have established that the sighting center distance for the eye is materially longer when looking generally horizontally than when looking downwardly, as suggested by distances $SCD_1$ and $SCD_2$ respectively, and the sighting center for the horizontally directed eye is at $SC_1$ while the sighting center for the downwardly directed eye is at $SC_2$.

Furthermore with reference to FIG. 15, wherein a plan view of the same eye is schematically shown, it will be appreciated that the horizontal or lateral average sighting center distance $SCD_1$ is longer than the sighting center distance $SCD_N$ when the eye is turned inwardly to the nasal obliquity indicated by "dash" outline 90, and also less than the sighting center distance $SCD_T$ when the eye is turned outwardly to the temporal obliquity indicated by "dot-dash" outline 91. It should be noted from the drawing that the stop point or sighting center, as it is also called, indicated within the eye at $SC_1$ and spaced slightly from the center of rotation point CR, seems to have shifted appreciably for these different lateral eye positions, as indicated by $SC_T$ and $SC_N$.

It has been found that with this additional more significant information as to different sighting center distances for different eye positions, closer tolerances as to desirable stop distances for determining the preferred inside base curve values for individual prescriptions can now be arrived at. Also, it has been found desirable at times to additionally consider an intermediate object distance of 0.75 meter, or approximately 30 inches, when attempting to care for certain individuals' visual requirements. Thus a range of intermediate distances from approximately 30 to 40 inches may be covered when more specific requirements do not have to be cared for.

Therefore, instead of arbitrarily using values at the lower end of a stop distance range for near object calculations and values near the larger end of the range for far object calculations, stop distances as they were actually found to exist for different parts of the prescription range and for a large percentage of the people tested in each different group may be used. These more exact values for a 20° downward (inferior) gaze, for a 30° oblique nasal gaze and for a 25° lateral temporal gaze have been investigated and used for design purposes and given in the following table:

TABLE H

| Spheres | Cyls. | Astigmatism | | | | Acuity | |
|---|---|---|---|---|---|---|---|
| | | 20° Inferior | | 30° Oblique Nasal | | 25° Lateral Temporal | |
| | | 0.33 and 0.40 m. | | 0.33 and 0.40 m. | | 0.75 and ∞ | |
| | | Stop range (mm.) | | Stop range (mm.) | | Stop range (mm.) | |
| | | Short | Long | Short | Long | Short | Long |
| +8.00 ○ | 0.00 | 24.5 | 30.5 | 25.5 | 31.0 | 26.0 | 32.0 |
| | −2.00 | 24.5 | 30.5 | 25.5 | 31.0 | 26.0 | 32.0 |
| | −4.00 | 24.5 | 30.5 | 25.5 | 31.0 | 26.0 | 32.0 |
| +6.00 ○ | 0.00 | 24.5 | 30.5 | 25.5 | 31.0 | 26.0 | 32.0 |
| | −2.00 | 24.5 | 30.5 | 25.5 | 31.0 | 26.0 | 32.0 |
| | −4.00 | 24.5 | 30.5 | 25.5 | 31.0 | 26.0 | 32.0 |
| +4.00 ○ | 0.00 | 24.5 | 30.5 | 25.5 | 31.0 | 26.0 | 32.0 |
| | −2.00 | 24.5 | 30.5 | 25.5 | 31.0 | 26.0 | 32.0 |
| | −4.00 | 25.0 | 31.0 | 26.0 | 31.5 | 26.5 | 32.5 |
| +2.00 ○ | 0.00 | 25.0 | 31.0 | 26.0 | 31.5 | 26.5 | 32.5 |
| | −2.00 | 25.0 | 31.0 | 26.0 | 31.5 | 26.5 | 32.5 |
| | −4.00 | 26.0 | 32.0 | 27.0 | 32.5 | 27.5 | 33.5 |
| 0.00 ○ | 0.00 | 25.5 | 31.5 | 26.5 | 32.0 | 27.0 | 33.0 |
| | −2.00 | 25.5 | 31.5 | 26.5 | 32.0 | 27.0 | 33.0 |
| | −4.00 | 25.5 | 31.5 | 26.5 | 32.0 | 27.0 | 33.0 |
| −2.00 ○ | 0.00 | 25.5 | 31.5 | 26.5 | 32.0 | 27.0 | 33.0 |
| | −2.00 | 25.5 | 31.5 | 26.5 | 32.0 | 27.0 | 33.0 |
| | −4.00 | 25.0 | 31.0 | 26.0 | 31.5 | 26.5 | 32.5 |
| −4.00 ○ | 0.00 | 25.5 | 31.5 | 26.5 | 32.0 | 27.0 | 33.0 |
| | −2.00 | 25.0 | 31.0 | 26.0 | 31.5 | 26.5 | 32.5 |
| | −4.00 | 25.0 | 31.0 | 26.0 | 31.5 | 26.5 | 32.5 |
| −6.00 ○ | 0.00 | 25.0 | 31.0 | 26.0 | 31.5 | 26.5 | 32.5 |
| | −2.00 | 25.0 | 31.0 | 26.0 | 31.5 | 26.5 | 32.5 |
| | −4.00 | 25.0 | 31.0 | 26.0 | 31.5 | 26.5 | 32.5 |
| −8.00 ○ | 0.00 | 25.0 | 31.0 | 26.0 | 31.5 | 26.5 | 32.5 |
| | −2.00 | 25.0 | 31.0 | 26.0 | 31.5 | 26.5 | 32.5 |
| | −4.00 | 25.0 | 31.0 | 26.0 | 31.5 | 26.5 | 32.5 |

Even though no single lens series design will perform perfectly for all selected object distances and all directions of viewing, as well as at the various different selected angular values therefor already mentioned when errors of astigmatism and acuity blur (acuity with lateral color) are being considered, the ranges including and between the short and long stop distances given above will allow these errors to be reduced appreciably. It should be kept in mind, of course, that the foregoing data as to long and short stop distances for prescriptive corrections (which has become available through greater knowledge concerning sag allowances, eyewire distances, sighting habits, and variations in sighting center distances encountered) has combined to bring about refinements which have resulted in the improved surfacing chart presently to be described.

Figure 16:
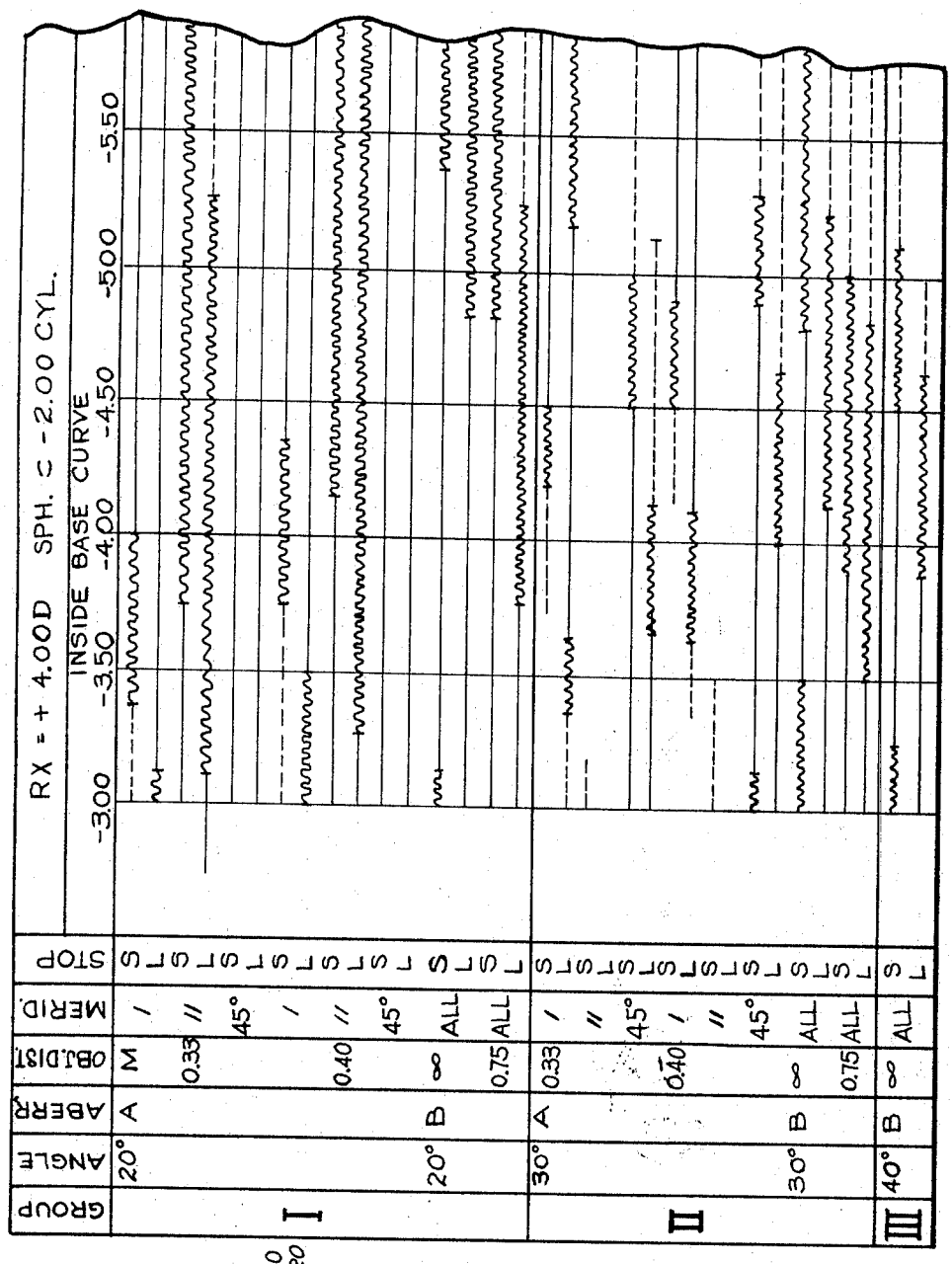
FIG. 16 shows a modified form of bar-graph.

In FIG. 16 is shown a bar-graph, much like that of FIG. 6, but giving more exact astigmatic and acuity tolerances. The astigmatic tolerances are for 20° and 30° angles of viewing for an Rx prescription of +4.00D spherical power combined with −2.00D cylinder power when provided with different inside base curve values; said tolerances being considered relative to short stop (S) and long stop (L) distances, relative to 0.33 and 0.40 meter near object distances and relative to the prime, double prime, and 45° meridional points on the lenses. The acuity tolerances for the same Rx prescription and likewise when provided with different inside base curve values are given with reference to 20°, 30°, and 40° angles of viewing and at 0.75 m. and infinity object distances. Note that on said bar-graph, the primary tolerances are shown by solid lines, the secondary tolerances by wavy lines, and the teritary tolerances by series of dashes. A code giving values for these tolerances is shown at the left of the bar-graph. (No tolerances for power errors at 0.75 meter, or 1 meter or infinity have been given because when the above criteria for astigmatism and acuity have been satisfied, any power error values which have been found to exist have not been of a limiting nature.)

In the selection of an inside base curve from the chart of FIG. 16 for a general purpose lens, it is desirable to give equal consideration to both astigmatism at 20° and acuity at 20° since one would not wish to sacrifice the distance vision of the lens by favoring the astigmatism correction at a location so near the center of the lens.

Stop distances for various different powers of lenses, for different object viewing distances and for different directions of viewing, as well as for different off-axis aberrations, have already been discussed. The eye doctor, however, is additionally very much interested in the eyewire distance ED, to be employed when the pair of lenses is positioned before the eyes of the patient. It is also essential for him to know the manner in which the lenses will be supported, the sizes and shapes of lenses and the size and facial characteristics of the individual.

In FIG. 13, the lens 10 is shown with a mounting bevel 92 adjacent its front surface. It will be appreciated from this figure, however, that the vertex distance, VD, is actually the sum of the eyewire distance ED and the sag allowance SA, combined. Thus, when the manner of supporting the lens is established, as by mounting bevel 92, and the value for the sag allowance determined in accordance with the prescriptive correction required the eyewire distance can be accurately determined. Also, more accu- TABLE J(a)

| NFC | Rx Sph. | 0.00 cyl. | | | |
|---|---|---|---|---|---|
| | | OBC | $R_B$ | AFC | $R_F$ |
| +11.00 | +7.00 | −4.00 | 132.50 | +10.62 | 49.91 |
| +10.25 | +6.00 | −4.25 | 124.71 | +9.93 | 53.37 |
| +9.50 | +5.00 | −4.50 | 117.78 | +9.27 | 57.17 |
| +8.00 | +4.00 | −4.00 | 132.50 | +7.86 | 67.43 |
| +7.25 | +3.00 | −4.25 | 124.71 | +7.15 | 74.13 |
| +6.25 | +2.00 | −4.25 | 124.71 | +6.17 | 85.90 |
| +5.50 | +1.00 | −4.50 | 117.78 | +5.44 | 97.43 |
| +5.50 | 0.00 | −5.50 | 96.36 | +5.44 | 97.42 |
| +4.75 | −1.00 | −5.75 | 92.17 | +4.70 | 112.77 |
| +4.25 | −2.00 | −6.25 | 84.80 | +4.20 | 126.19 |
| +3.75 | −3.00 | −6.75 | 78.52 | +3.70 | 143.24 |
| +2.75 | −4.00 | −6.75 | 78.52 | +2.70 | 196.30 |
| +2.25 | −5.00 | −7.25 | 73.10 | +2.19 | 242.01 |
| +1.75 | −6.00 | −7.75 | 68.39 | +1.67 | 317.37 |
| +1.25 | −7.00 | −8.25 | 64.24 | +1.15 | 460.87 |
| +1.25 | −8.00 | −9.25 | 57.30 | +1.15 | 460.87 |

TABLE J(b)

| Rx Sph. | −2.00 cyl. | | | | −4.00 cyl. | | | |
|---|---|---|---|---|---|---|---|---|
| | OBC/OCC | $R_B/R_C$ | NFC/AFC | $R_F$ | OBC/OCC | $R_B/R_C$ | NFC/AFC | $R_F$ |
| +7.00 | −4.00 | 132.50 | +11.00 | 49.91 | −4.00 | 132.50 | +11.00 | 49.91 |
| | −6.00 | 88.33 | +10.62 | | −8.00 | 66.25 | +10.62 | |
| +6.00 | −4.25 | 124.71 | +10.25 | 53.37 | −4.25 | 124.71 | +10.25 | 53.37 |
| | −6.25 | 84.80 | +9.93 | | −8.25 | 64.24 | +9.93 | |
| +5.00 | −4.50 | 117.78 | +9.50 | 57.17 | −4.50 | 117.78 | +9.50 | 57.17 |
| | −6.50 | 81.54 | +9.27 | | −8.50 | 62.35 | +9.27 | |
| +4.00 | −4.00 | 132.50 | +8.00 | 67.43 | −4.75 | 111.58 | +8.75 | 61.77 |
| | −6.00 | 88.33 | +7.86 | | −8.75 | 60.57 | +8.58 | |
| +3.00 | −4.25 | 124.71 | +7.25 | 74.13 | −5.00 | 106.00 | +8.00 | 67.43 |
| | −6.25 | 84.80 | +7.15 | | −9.00 | 58.89 | +7.86 | |
| +2.00 | −4.25 | 124.71 | +6.25 | 85.90 | −5.25 | 100.95 | +7.25 | 74.13 |
| | −6.25 | 84.80 | +6.17 | | −9.25 | 57.30 | +7.15 | |
| +1.00 | −5.25 | 100.95 | +6.25 | 85.90 | −4.50 | 117.78 | +5.00 | 97.43 |
| | −7.25 | 73.10 | +6.17 | | −8.50 | 62.35 | +5.44 | |
| 0.00 | −4.75 | 111.58 | +4.75 | 112.77 | −4.25 | 124.71 | +4.25 | 126.19 |
| | −6.75 | 78.52 | +4.70 | | −8.25 | 64.24 | +4.20 | |
| −1.00 | −4.75 | 111.58 | +3.75 | 143.24 | −4.25 | 124.71 | +3.25 | 165.63 |
| | −6.75 | 78.52 | +3.70 | | −8.25 | 64.24 | +3.20 | |
| −2.00 | −5.25 | 100.95 | +3.25 | 165.63 | −4.25 | 124.71 | +2.25 | 242.01 |
| | −7.25 | 73.10 | +3.25 | | −8.25 | 64.24 | +2.19 | |
| −3.00 | −5.75 | 92.17 | +2.75 | 196.30 | −5.25 | 100.95 | +2.25 | 242.01 |
| | −7.75 | 68.39 | +2.70 | | −9.25 | 57.30 | +2.19 | |
| −4.00 | −6.25 | 84.80 | +2.25 | 242.01 | −5.75 | 92.17 | +1.75 | 317.37 |
| | −8.25 | 64.24 | +2.19 | | −9.75 | 54.36 | +1.67 | |
| −5.00 | −6.75 | 78.52 | +1.75 | 317.37 | −6.25 | 84.80 | +1.25 | 460.87 |
| | −8.75 | 60.57 | +1.67 | | −10.25 | 51.71 | +1.15 | |
| −6.00 | −7.75 | 68.39 | +1.25 | 317.37 | −7.25 | 73.10 | +1.25 | 460.87 |
| | −9.75 | 54.36 | +1.67 | | −11.25 | 47.11 | +1.15 | |
| −7.00 | −8.25 | 64.24 | +1.25 | 460.87 | −7.75 | 68.39 | +0.75 | 828.13 |
| | −10.25 | 51.71 | +1.15 | | −11.75 | 45.11 | +0.64 | |
| −8.00 | −8.75 | 60.57 | +0.75 | 828.13 | −8.25 | 64.24 | +0.25 | 4,416.67 |
| | −10.75 | 49.30 | +0.64 | | −12.25 | 43.27 | +0.12 | | rate stop distances have been possible by use of different sighting center distances as determined for different directions of viewing and by the determination of precise values for the sag allowances for different lenses of different rear base curve values.

A surfacing chart intended for use in forming a general purpose lens series, somewhat like that of FIG. 9, but having more precise values for inner base curve power values, is shown in FIG. 17. This chart is based upon the contemplated use of the improved stop distances given in Table H. Thus, in FIG. 17, in a manner like that indicated for FIG. 9 two numbers would be used in each small rectangle area laterally opposite the OBC values and directly below the cyl. values, as suggested, for example, by the dotted lines 94A and 94B. Therefore in the area indicated, the dioptric number for 94A would be —4.25, and for 94B, the dioptric number would be —4.25 plus (—1.00) or —5.25.

In Table J, on preceding page, which for convenience has been divided into two parts J(a) and J(b), radii of curvatures for the ocular base curves ($R_B$), for the effective front curve ($R_F$), and for the ocular cylindrical curves ($R_C$) for use with this chart are given and are based on a standard 1.53 index; and notations in the Table J correspond with those in Tables C2(a) and C2(b):

The use of this lens series design is well suited for use in forming one-piece bifocal lenses of the type shown in FIG. 4A wherein two sections for the upper and lower fields are separated by a straight cliff-like edge 95. Only one inside spherical or toric surface would be provided on the lens but two different spherical front surfaces 26a and 26b having radii $R_{F1}$ and $R_{F2}$, respectively, would be used in monaxial relation to each other. This can be done by picking a front curve to combine with the ocular base surface so as to favor either the top section or the bottom section, or it would be possible to pick a compromise therebetween.

In the foregoing discussion it has been outlined how special purpose series of lenses may be designed by selecting, from a collection of bar-graphs, base curves which provide optimal performance for a particularly long stop position, short stop position, a particular object distance. Also, it has been pointed out how a particular area of the lens can be given priority by selecting those base curves which provide optimal performance for the toric meridian in which those areas lie. It has also been pointed out that such special considerations result in base curve selections which are steeper, or flatter, than those selected for a general purpose series.

In general, near object distances and long stop positions make for flatter base curves. Acuity corrections require flatter curves than do the corrections for astigmatism, and corrections at the "double prime" points on the cylinder meridian for either astigmatism or acuity errors require flatter curves than do the corrections for errors at the "prime points" on the sphere meridian of the lenses.

Table K, which lists a choice of base curves for correcting astigmatism at a 13-inch object distance for the longer stop positions indicates one of the flattest practical designs to be found by applying the thinking previously described.

There is a large percentage of prescriptions which lie within an area described by Rx sphere values of +5.00 diopters to —8.00 diopters combined with cylinder corrections of 0.125 diopters to —3.00 diopters and which is, accordingly, the most important area to satisfy insofar as each of the tables of values already given is concerned.

It is known that approximately 70% of the people who need eyeglasses need a different prescription in one eye than in the other. Also, it is desirable that two eyes of a person be fitted with lenses which are taken from the same lens series and thus of a similar design. This is necessary because binocular fusion and binocular interpretation of space which results from good fusion is upset if the combined image as seen by a pair of eyes are not equally sharp, or if it is necessary for the person to attempt to differently accommodate between his two eyes in order to compensate for slight prescriptive errors in the eyeglasses being used. People who wear glasses and who are using both eyes together in good binocular fusion may not see as clearly binocularly if one eye does not have as sharp a vision as the other. This can be shown in refractive tests where one eye will perform better than both eyes together. It is known that if both eyes are corrected to their best possible vision with spectacle lenses, their binocular acuity then will be greater than monocular acuity in either eye alone. So it is necessary that both eyes be optimumly corrected by lenses of the same series. It is necessary, therefore, that the prescriptions of a lens series which are different but adjacent and removed from one another by one or two prescriptive steps should be furnished with lenses whose base curves are as near the same as can be conveniently arranged.

It is essential in a lens series that prescriptions which are different but different only by one or perhaps two prescriptive steps should each have close to the optimum design as possible since it is only with the optimum design that the sharpest images and the least need for accommodation for clear seeing is obtained. However, designing two different lenses both for optimum performance results in different base curves. Different base curves yield lenses whose magnifications are different and it is known that it is undesirable to have lenses which present different magnifications to the two eyes. Therefore, the designer is faced with the problem of providing optimum performance with respect to clearness of image and lack of the need of accommodation, and, at the same time, maintaining base curves which are preferably identical, or at least, differ only by slight amounts. This last-mentioned situation is the clue to the solution of the design problem.

If base curves differ only slightly from each other and each one is designed to provide nearly optimum performance for a large number of patients whose requirements may differ among each other slightly as to size of eyeball, position of wearing of spectacles and individual visual needs, it is only by supplying a group of lenses as a series which are so designed and so co-related, that a doctor can have at his command and prescribe lenses for his patient (whose needs for his two eyes are slightly different) and be certain that the patient will receive good sharp vision through each eye singly, and, at the same time, be furnished with a pair of lenses which will least disturb the patient's binocular vision and interpretation

TABLE K

LONG STOP SERIES

| Rx Sphere | Nominal Front Sphere and Ocular Base Curve Powers (at 13" Object Distance and 1.53 Index) | | | | | |
|---|---|---|---|---|---|---|
| | 0.00 Cyl. | | —2.00 Cyl. | | —4.00 Cyl. | |
| | $D_1$ | $D_2$ | $D_1$ | $D_2$ | $D_1$ | $D_2$ |
| +7.00 | 10.25 | —3.25 | 10.25 | —3.25 | | |
| +6.00 | 9.50 | —3.50 | 9.50 | —3.50 | 10.25 | —4.25 |
| +5.00 | 8.75 | —3.75 | 8.75 | —3.75 | 9.50 | —4.50 |
| +4.00 | 7.25 | —3.25 | 7.25 | —3.25 | 8.75 | —4.75 |
| +3.00 | 6.50 | —3.50 | 6.50 | —3.50 | 7.25 | —4.25 |
| +2.00 | 5.75 | —3.75 | 5.75 | —3.75 | 6.50 | —4.50 |
| +1.00 | 5.00 | —4.00 | 5.00 | —4.00 | 5.75 | —4.75 |
| 0.00 | 4.25 | —4.25 | 4.25 | —4.25 | 5.00 | —5.00 |
| —1.00 | 3.25 | —4.25 | 3.25 | —4.25 | 4.25 | —5.25 |
| —2.00 | 2.25 | —4.25 | 2.25 | —4.25 | 2.25 | —4.25 |
| —3.00 | 2.25 | —5.25 | 2.25 | —4.25 | 2.25 | —4.25 |
| —4.00 | 1.25 | —5.25 | 0.25 | —4.25 | 0.25 | —4.25 |
| —5.00 | 0.25 | —5.25 | 0.25 | —5.25 | —0.50 | —4.50 |
| —6.00 | 0.25 | —6.25 | 0.25 | —6.25 | —0.50 | —5.50 |
| —7.00 | —0.50 | —6.50 | —0.50 | —6.50 | —0.75 | —6.25 |
| —8.00 | —0.50 | —7.50 | —0.75 | —7.25 | —0.75 | —7.25 | of space. If a designer discloses optimum designs as single lenses but does not make the provision for a practical number of base curves at the same time giving nearly optimum correction for prescriptions which are slightly different from those for which the base is ideal, he will have failed to provide, through the eye-care profession, to the patient lenses which will give the patient the best possible vision both monocularly and binocularly.

It is not enough to say that one can design a lens which provides sharp acuity. It is necessary that this supplier have a related series of lenses designed as a unit so that regardless of the prescription and regardless of the slight differences in prescription between the two eyes of the same patient, a doctor can prescribe a pair of lenses and know that he is prescribing a certain type of visual correction to his patient and also to both eyes of this patient. By "designed as a unit," it is meant lenses which are designed according to the same design philosophy and with sufficiently frequent changes in base curves so that no prescription within the series differs significantly from adjacent prescriptions with respect to this design philosophy.

All of the surface curvatures, as defined herein, when formed of glass may be ground and polished in a conventional manner and by the use of conventional known grinding and polishing machines and techniques. It is further to be understood that if the lenses are formed of commercially known transparent plastics or the like, said lenses may be cast, folded, or otherwise formed with the desired surface curvatures by known commercial techniques.

In view of the fact that in the dioptric range of from −8.00D to −20.00D, the lengths of eyeballs of individuals tend to be of larger values and the optimum front curves of the lenses tend to be of lesser convex values, these two effects tend to cancel each other; with the result that the range of stop distances to be employed remain substantially unchanged, this range extending from substantially 24.5 millimeters to substantially 33.0 millimeters, and thus the differences in stop distances within this range are attributable to object distances, angles of view, and individuals' requirements in the same manner as described previously.

Having described our invention, we claim:

1. An ophthalmic lens series comprising lenses formed of a transparent material of predetermined refractive index and each having front and rear refractive surfaces formed thereon, said front surfaces being spherical curvatures and each disposed upon a different one of the lenses in predetermined axially spaced relation to a prescriptive curvature on the rear surface thereof, said front and rear curvatures in each case being arranged to provide a lens having a spherical dioptric power lying within a range of values from +7.00D to −8.00D in combination with a cylindrical power lying within a range of values from zero to −4.00D, each lens of a spherical prescription and each lens of a spherical prescription combined with a cylindrical correction, having nominal front spherical curvatures falling within the limits correspondingly indicated therefor in the following table.

| Rx | Nominal Front Sphere Powers | | |
|---|---|---|---|
| | 0.00 Cyl. | −2.00 Cyl. | −4.00 Cyl. |
| +7.00 | +11.00 | +11.00 | +11.00 |
| +6.00 | +10.25 | +10.25 | +10.25 |
| +5.00 | +9.50 | +9.50 | +9.50 |
| +4.00 | +8.00 | +8.00 | +8.75 |
| +3.00 | +7.25 | +7.25 | +8.00 |
| +2.00 | +6.25 | +6.25 | +7.25 |
| +1.00 | +6.25 | +6.25 | +5.50 |
| 0 | +5.50 | +4.75 | +4.25 |
| −1.00 | +4.75 | +3.75 | +3.25 |
| −2.00 | +4.25 | +3.25 | +2.25 |
| −3.00 | +3.75 | +2.75 | +2.25 |
| −4.00 | +2.75 | +2.25 | +1.75 |
| −5.00 | +2.25 | +1.75 | +1.25 |
| −6.00 | +1.75 | +1.75 | +1.25 |
| −7.00 | +1.25 | +1.25 | +0.75 |
| −8.00 | +1.25 | +0.75 | +0.25 | and prescriptions of intermediate fractional values having nominal front spherical curvatures of values which correspondingly fall between the values listed in said table.

2. An ophthalmic lens series comprising a plurality of lenses formed of transparent material of a given refractive index, the lenses of said series having spherically curved front surfaces of different predetermined surface curvatures and finished prescriptive rear surfaces thereon, said front surfaces being of such different selected correlated curvatures relative to each other and with reference to the prescriptive rear surface curvatures thereon and the predetermined axial thicknesses thereof as to jointly provide a full range of ophthalmic prescriptive corrections of spherical powers from +8.00 to −6.00D and such spherical powers in combination with negative cylindrical powers from near zero to −4.00D, each in uniformly graduated steps of diopters and selected fractions thereof, the front surface curvatures of said lenses being of such selected spherical values and the rear surface curvatures being of such selected combined spherical and cylindrical values as to jointly provide, at any desired prescriptive value within said range and at a stop distance being between 24 and 33 millimeters for the hyperopic eye, and at a stop distance between 25 and 32 millimeters for the myopic eye for near object fields at a 20-degree angle from a central line of sight, the prescriptive correction desired, with no error of astigmatism greater than 5% of the prescriptive power thereof in the strongest meridian of said lens, and provide at a 30-degree angle of view no error of astigmatism greater than 8% of the prescriptive power thereof in the strongest meridian of said lens, and wherein each front surface curvature has a dioptric power value ($D_N$) which, relative to the spherical prescriptive power value ($De$) provided thereby, for spherical prescriptions falls within the range of dioptric power values determined by the equation $$D_N = \frac{(De+17.5)^2}{48} - 1.3 \pm 1.0$$

for spherical combined with −2.00D cylindrical prescriptions falls within the range of dioptric power values determined by the equation $$D_N = \frac{(De+15.5)^2}{42} - 1.0 \pm 1.0$$

and for spherical combined with −4.00D cylindrical prescriptions falls within the range of dioptric power values determined by the equation $$D_N = \frac{(De+15.5)^2}{40} - 0.8 \pm 1.0$$

3. An ophthalmic lens series as described in claim 2 and wherein the lenses of said series are each modified at a part of the forward side thereof so as to provide through that part of the lens an object field of relatively stronger spherical power than through other parts of said lens.

4. An ophthalmic lens series comprising a plurality of lenses formed of transparent material of a given refractive index, the lenses of said series having spherically curved front surfaces of different predetermined surface curvatures and finished prescriptive rear surfaces thereon, said front surfaces being of such different selected correlated curvatures relative to each other and with reference to the prescriptive rear surface curvatures thereon and the predetermined axial thicknesses thereof as to jointly provide a full range of ophthalmic prescriptive corrections including spherical powers and such spherical powers in combination with negative cylindrical powers, each in uniformly graduated steps of diopters and selected fractions thereof, each front surface curvature having a dioptric power value ($D_N$) which relative to the spherical prescriptive power value (De) provided thereby substantially satisfies the equation $$D_N = \frac{(De+17.5)^2}{48} - 1.3$$

and wherein said range of spherical powers extends from +8.00 to —8.00D, and said range of cylindrical powers extending from near 0 to —4.00D, said lenses having an error of astigmatism for near object distances and at a 20° angle relative to the central line of sight through the lenses of no more than 5% of the power in the strongest meridian of said lens, and having an error of acuity including lateral color for intermediate and far object distances and at said 20° angle relative to said central line of sight of said lenses of no more than 5% of the power in said strongest meridian.

5. An ophthalmic lens series for use at short stop distances of from 24 to 28 mm. comprising a plurality of lenses formed of transparent material of a given refractive index, the lenses of said series having spherically curved front surfaces of different predetermined surface curvatures thereon, said front surfaces being of such different selected correlated curvatures and finished prescriptive rear surfaces relative to each other and with reference to the prescriptive rear surface curvatures thereon and the predetermined axial thicknesses thereof as to jointly provide a full range of ophthalmic prescriptive corrections including spherical powers from +8.00 to —6.00D and such spherical powers in combination with negative cylindrical powers from near zero to —4.00D, each in uniformly graduated steps of diopters and selected fractions thereof, each front surface curvature having a dioptric power value which, relative to the spherical prescriptive power (De) provided thereby, for spherical prescriptions falls within the range of dioptric power values determined by the equation $$D_N = \frac{(De+19.4)^2}{54} - 1.0$$

for spherical combined with —2.00D cylindrical prescriptions falls within the range of dioptric power values determined by the equation $$D_N = \frac{(De+17.6)^2}{47} - 1.0$$

and for spherical combined with —4.00D cylindrical prescriptions falls within the range of dioptric power values determined by the equation $$D_N = \frac{(De+15.9)^2}{40} - 0.9$$

said lenses having an error of astigmatism for near object distances and at a 20° angle relative to the central lines of sight through the lenses of no more than substantially 5% of the power in the strongest meridian of the lens, and having an error of acuity including lateral color for intermediate and far object distances and at said 20° angle relative to said central line of sight of said lenses of no more than 5% of the power in said strongest meridian.

6. An ophthalmic lens series as described in claim 5, and wherein the lenses of said series are each modified at a part of the forward side thereof so as to provide through said part an object field of relatively stronger spherical power than through other parts of said lens.

7. An ophthalmic lens series comprising lenses formed of a transparent material of predetermined refractive index and each having front and rear refractive surfaces formed thereon, said front surfaces being spherical curvatures and disposed in predetermined axially spaced relation to a prescriptive curvature on the rear surface thereof, said curvatures being arranged in each case to provide a lens having a spherical dioptric power lying within a range of values from +8.00D to —20.00D combined with a cylindrical power lying within a range of values from zero to —4.00D, each lens of a spherical prescription and each lens of a spherical prescription combined with a cylindrical correction, having nominal front spherical curvatures falling within the limits correspondingly indicated therefor in the following table.

| Rx | Nominal Front Sphere Powers | | |
|---|---|---|---|
|  | Cyl.=0.00D | Cyl.=—2.00D | Cyl.=—4.00D |
| +8.00 | +12.50 to 14.00 | +12.50 to 13.25 | +12.50 to 13.00. |
| +6.00 | +10.00 to 10.50 | +10.00 to 10.50 | +10.00 to 10.75. |
| +4.00 | +8.00 to 8.50 | +8.00 to 8.50 | +8.25 to 8.75. |
| +2.00 | +6.00 to 7.00 | +6.00 to 7.25 | +7.00 to 8.50. |
| 0.00 | +4.00 to 7.75 | +4.00 to 4.75 | +4.00 to 5.50. |
| —2.00 | +3.00 to 4.25 | +2.25 to 3.25 | +2.00 to 3.00. |
| —4.00 | +1.50 to 2.75 | +1.50 to 2.75 | +1.00 to 1.75. |
| —6.00 | +1.00 to 1.75 | +1.00 to 1.50 | +0.50 to 1.00. |
| —8.00 | 0.00 to +0.75 | +0.25 to +0.75 | +0.25 to +0.75. |
| —10.00 | —0.25 to +0.50 | —0.25 to +0.25 | —0.25 to +0.25. |
| —12.00 | —0.25 to —1.25 | —0.50 to —0.75 | —0.50 to —0.75. |
| —14.00 | —0.25 to —1.25 | —0.75 | —0.50. |
| —16.00 | —1.25 to —1.50 | —0.75 to —1.00 | —0.75. |
| —18.00 | —1.25 | —1.00 | —0.75. |
| —20.00 | —1.50 | —1.25 | —1.00. | and with prescriptions of intermediate values having nominal front spherical curvatures of values which correspondingly fall between the values listed in said table.

8. A graduated series of semi-finished ophthalmic lens blanks, each formed of transparent lens material of a given refractive index and having a spherically curved nominal finished front surface curvature thereon, the blanks of said series being of such front surface curvatures and arranged in such predetermined stepped dioptric relation to each other as to be spaced between approximately one-half and one diopter from each other and jointly care for a full range of spherical prescriptive corrections from +8.00D to —8.00D in combination with cylindrical corrections ranging from near zero to —4.00D, the front spherical surface curvature of each of said semi-finished blanks being so controlled as to fall within the limits correspondingly indicated therefor in the following table.

| Rx | Nominal Front Sphere Powers | | |
|---|---|---|---|
|  | 0.00 Cyl. | —2.00 Cyl. | —4.00 Cyl. |
| +8.00 | +13.00 | +12.50 to +13.25 | +12.75 to +13.50. |
| +6.00 | +10.50 to +11.25 | +10.50 to +11.00 | +11.00 to +11.25. |
| +4.00 | +8.75 to +9.75 | +8.75 to +9.00 | +9.00 to +9.25. |
| +2.00 | +6.75 to +7.75 | +7.25 to +7.50 | +7.00 to +9.00. |
| 0.00 | +2.50 to +7.00 | +5.50 to +7.50 | +5.00 to +5.50. |
| —2.00 | +2.25 to +5.50 | +3.75 to +4.75 | +2.75 to +3.25. |
| —4.00 | +3.50 to +4.00 | +2.75 to +3.00 | +2.25 to +2.75. |
| —6.00 | +2.25 to +3.00 | +1.75 to +2.25 | +1.25 to +1.75. |
| —8.00 | +1.00 to +1.50 | +0.75 to +1.00 | +0.50 to +0.75. |

9. A graduated series of semi-finished ophthalmic lens blanks, each formed of transparent lens material of a given refractive index and having a spherically curved nominal finished front surface curvature thereon, the blanks of said series being of such surface curvatures and arranged in such predetermined stepped dioptric relation to each other as to be spaced between approximately one-half and one diopter from each other and jointly care for a full range of spherical prescriptive corrections from +7.00D to −8.00D in combination with cylindrical corrections ranging from near zero to −4.00D, the front spherical surface curvature of each of said semi-finished blanks being so controlled as to fall within the limits correspondingly indicated therefor in the following table.

| Rx | Nominal Front Sphere Powers | | |
|---|---|---|---|
| | 0.00 Cyl. | −2.00 Cyl. | −4.00 Cyl. |
| +7.00 | +11.00 | +11.00 | +11.00 |
| +6.00 | +10.25 | +10.25 | +10.25 |
| +5.00 | +9.50 | +9.50 | +9.50 |
| +4.00 | +8.00 | +8.00 | +8.75 |
| +3.00 | +7.25 | +7.25 | +8.00 |
| +2.00 | +6.25 | +6.25 | +7.25 |
| +1.00 | +5.50 | +6.25 | +5.50 |
| 0 | +5.50 | +4.75 | +4.25 |
| −1.00 | +4.75 | +3.75 | +3.25 |
| −2.00 | +4.25 | +3.25 | +2.25 |
| −3.00 | +3.75 | +2.75 | +2.25 |
| −4.00 | +2.75 | +2.25 | +1.75 |
| −5.00 | +2.25 | +1.75 | +1.25 |
| −6.00 | +1.75 | +1.75 | +1.25 |
| −7.00 | +1.25 | +1.25 | +0.75 |
| −8.00 | +1.25 | +0.75 | +0.25 |

10. An ophthalmic lens series comprising lenses formed of a transparent material of predetermined refractive index and each having front and rear refractive surfaces formed thereon, said front surfaces being spherical curvatures and each disposed upon a different one of the lenses in predetermined axially spaced relation to a prescriptive curvature on the rear surface thereof, said front and rear curvatures in each case being arranged to provide a lens having a spherical dioptric power lying within a range of values from +6.00D to −8.00D in combination with a cylindrical power lying within a range of values from zero to −4.00D, each lens of a spherical prescription and each lens of a spherical prescription combined with a cylindrical correction, having nominal front spherical curvatures falling within the limits correspondingly indicated therefor in the following table.

| Rx | Nominal Front Sphere Powers | | |
|---|---|---|---|
| | 0.00 Cyl. | −2.00D Cyl. | −4.00D Cyl. |
| +6.00 | 10.25 to 9.50 | 10.25 to 9.50 | 10.50 to 10.25 |
| +5.00 | 9.25 to 8.75 | 9.25 to 8.75 | 9.25 to 9.50 |
| +4.00 | 8.25 to 7.25 | 8.25 to 7.25 | 8.50 to 8.75 |
| +3.00 | 7.00 to 6.50 | 7.25 to 6.50 | 8.00 to 7.25 |
| +2.00 | 6.50 to 5.75 | 6.50 to 5.75 | 7.75 to 6.50 |
| +1.00 | 6.00 to 5.00 | 5.50 to 5.00 | 6.25 to 5.75 |
| 0.00 | 5.75 to 4.25 | 4.50 to 4.25 | 4.75 to 5.00 |
| −1.00 | 4.75 to 3.25 | 3.50 to 3.25 | 3.75 to 4.25 |
| −2.00 | 3.75 to 2.25 | 2.75 to 2.25 | 2.50 to 2.25 |
| −3.00 | 2.75 to 2.25 | 2.50 to 2.25 | 2.00 to 2.25 |
| −4.00 | 2.00 to 1.25 | 2.00 to 0.25 | 1.50 to 0.25 |
| −5.00 | 1.75 to 0.25 | 1.50 to 0.25 | 1.00 to −0.50 |
| −6.00 | 1.50 to 0.25 | 0.75 to −0.25 | 0.75 to −0.50 |
| −7.00 | 0.75 to −0.50 | 0.75 to −0.50 | 0.50 to −0.75 |
| −8.00 | 0.25 to −0.50 | 0.75 to −0.75 | 0 to −0.75 | and prescriptions of intermediate fractional values having nominal front spherical curvatures of values which correspondingly fall between the values listed in said table.

11. An ophthalmic lens series of the negative toric type comprising a plurality of lenses formed of transparent material of a given refractive index, the lenses of said series having spherically curved front surfaces of different predetermined surface curvatures and finished prescriptive rear surfaces thereon, said front surfaces being of such different selected correlated curvatures relative to each other and with reference to the prescriptive rear surface curvatures thereon and the predetermined axial thicknesses thereof as to jointly provide a full range of ophthalmic prescriptive corrections including spherical powers from +7.00 to −6.00D in combination with negative cylindrical powers from near zero to −4.00D, each in uniformly graduated steps of diopters and selected fractions thereof, said series of negative toric lenses being characterized in that the front surface curvatures of said lenses are of such selected spherical values and the rear surface curvatures are of such selected combined spherical and cylindrical values as to jointly provide any desired prescriptive value within said range, each front surface curvature having a nominal dioptric power value ($D_N$) which, relative to the spherical prescriptive power value ($De$) provided thereby for spherical prescriptions, falls between the dioptric power values determined by the equation $$D_N = \frac{(De+19.4)^2}{54} - 1.0 \pm 1.0$$

for spherical prescriptions combined with −2.00D cylindrical power falls between the dioptric power values determined by the equation $$D_N = \frac{(De+17.6)^2}{47} - 1.0 \pm 1.0$$

and for spherical prescriptions combined with −4.00D cylindrical powers fall between the dioptric power values determined by the equation $$D_N = \frac{(De+15.9)^2}{40} - 0.9 \pm 1.0$$

and prescriptions of intermediate fractional values having nominal front spherical curvatures of value which correspondingly fall between the values obtained.

12. An ophthalmic lens series comprising lenses formed of a transparent material of a predetermined refractive index and each having front and rear refractive surfaces formed thereon, said front surfaces being of spherical curvatures and disposed in predetermined axially spaced relation to a prescriptive curvature on the rear surfaces thereof, said curvatures being arranged in each case to provide a lens having a spherical dioptric power lying within a range of values from approximately +7.00 to −8.00 combined with a cylindrical power lying within a range of values from zero to −4.00D, said lens, each lens of a spherical prescription and of a spherical prescription combined with a cylindrical correction, having a nominal front spherical curvature of the value correspondingly indicated therefor in the following table.

| Rx | Nominal Front Sphere Powers | | |
|---|---|---|---|
| | Cyl.=0.00D | Cyl.=−2.00D | Cyl.=−4.00D |
| +7.00 | +11.00 | +11.00 | +11.00 |
| +6.00 | +10.25 | +10.25 | +10.25 |
| +5.00 | +9.50 | +9.50 | +9.50 |
| +4.00 | +8.00 | +8.00 | +8.75 |
| +3.00 | +7.25 | +7.25 | +8.00 |
| +2.00 | +6.25 | +6.25 | +7.25 |
| +1.00 | +5.50 | +6.25 | +5.50 |
| 0.00 | +5.50 | +4.75 | +4.25 |
| −1.00 | +4.75 | +3.75 | +3.25 |
| −2.00 | +4.25 | +3.25 | +2.25 |
| −3.00 | +3.75 | +2.75 | +2.25 |
| −4.00 | +2.75 | +2.25 | +1.75 |
| −5.00 | +2.25 | +1.75 | +1.25 |
| −6.00 | +1.75 | +1.25 | +1.25 |
| −7.00 | +1.25 | +1.25 | +0.75 |
| −8.00 | +1.25 | +0.75 | +0.25 | and with prescriptions of intermediate fractional values having nominal front spherical curvatures of values which correspondingly fall between values listed in said table.

13. An ophthalmic lens series comprising lenses formed of a transparent material of predetermined refractive index and each having front and rear refractive surfaces formed thereon, said front surfaces being spherical curvatures and each disposed upon a different one of the lenses in predetermined axially spaced relation to a prescriptive curvature on the rear surface thereof, said front and rear curvatures in each case being arranged to provide a lens having a spherical dioptric power lying within a range of values from approximately +6.00D to −8.00D in combination with a cylindrical power lying within a range of values from zero to −4.00D, each lens of a spherical prescription and each lens of a spherical prescription combined with a cylindrical correction, having nominal front spherical curvatures falling within the limits correspondingly indicated therefor in the following table.

| Rx | Nominal Front Sphere Powers | | |
|---|---|---|---|
| | 0.00 Cyl. | −2.00D Cyl. | −4.00D Cyl. |
| +6.00 | +10.25 to 9.50 | +10.25 to 9.50 | +10.25 to 10.25. |
| +5.00 | +9.50 to 8.75 | +9.50 to 8.75 | +9.50 to 9.50. |
| +4.00 | +8.00 to 7.25 | +8.00 to 7.25 | +8.75 to 8.75. |
| +3.00 | +7.25 to 6.50 | +7.25 to 6.50 | +8.00 to 7.25. |
| +2.00 | +6.25 to 5.75 | +6.25 to 5.75 | +7.25 to 6.50. |
| +1.00 | +5.50 to 5.00 | +6.25 to 5.00 | +5.50 to 5.75. |
| 0.00 | +5.50 to 4.25 | +4.75 to 4.25 | +4.25 to 5.00. |
| −1.00 | +4.75 to 3.25 | +3.75 to 3.25 | +3.25 to 4.25. |
| −2.00 | +4.25 to 2.25 | +3.25 to 2.25 | +2.25 to 2.25. |
| −3.00 | +3.75 to 2.25 | +2.75 to 2.25 | +2.25 to 2.25. |
| −4.00 | +2.75 to 1.25 | +2.25 to 0.25 | +1.75 to 0.25. |
| −5.00 | +2.25 to 0.25 | +1.75 to 0.25 | +1.25 to −0.50. |
| −6.00 | +1.75 to 0.25 | +1.25 to −0.25 | +1.25 to −0.50. |
| −7.00 | +1.25 to −0.50 | +1.25 to −0.50 | +0.75 to −0.75. |
| −8.00 | +1.25 to −0.50 | +0.75 to −0.75 | +0.25 to −0.75. | and prescriptions of intermediate fractional values having nominal front spherical curvatures of values which correspondingly fall between the values listed in said table.

14. An ophthalmic lens series as described in claim 13 and wherein the lenses of said series are each modified at a part of the forward side thereof so as to provide through that part of the lens an object field of relatively stronger spherical power than through other parts of said lens.

15. A graduated series of semi-finished ophthalmic lens blanks, each formed of a transparent lens material of a given refractive index and having a finished spherically curved nominal front surface curvature thereon, the blanks of said series being of such surface curvatures and arranged in such predetermined stepped dioptric relation to each other as to be spaced between approximately one-half and one diopter from each other and jointly care for a full range of spherical corrections from +6.00D to −8.00D in combination with cylindrical corrections from zero to −4.00D, the front spherical surface curvature of each of said semi-finished blanks being so controlled as to fall within the limits correspondingly indicated therefor in the following table.

| Rx | Nominal Front Sphere Powers | | |
|---|---|---|---|
| | 0.00 Cyl. | −2.00D Cyl. | −4.00D Cyl. |
| +6.00 | +9.50 | +9.50 | +10.25 |
| +5.00 | +8.75 | +8.75 | +9.50 |
| +4.00 | +7.25 | +7.25 | +8.75 |
| +3.00 | +6.50 | +6.50 | +7.25 |
| +2.00 | +5.75 | +5.75 | +6.50 |
| +1.00 | +5.00 | +5.00 | +5.75 |
| 0.00 | +4.25 | +4.25 | +5.00 |
| −1.00 | +3.25 | +3.25 | +4.25 |
| −2.00 | +2.25 | +2.25 | +2.25 |
| −3.00 | +2.25 | +2.25 | +2.25 |
| −4.00 | +1.25 | +0.25 | +0.25 |
| −5.00 | +0.25 | +0.25 | −0.50 |
| −6.00 | +0.25 | −0.25 | −0.50 |
| −7.00 | −0.50 | −0.50 | −0.75 |
| −8.00 | −0.50 | −0.75 | −0.75 |

References Cited

UNITED STATES PATENTS

| | | | |
|---|---|---|---|
| 1,315,667 | 9/1919 | Hill et al. | 351—176 |
| 1,588,559 | 6/1926 | Tillyer | 351—176 |
| 1,715,784 | 6/1929 | Rayton | 351—176 |
| 2,180,887 | 11/1939 | Tillyer | 351—176 |
| 2,391,045 | 12/1945 | Tillyer | 351—176 |
| 2,543,949 | 3/1951 | Wootten | 351—176 |

DAVID H. RUBIN, *Primary Examiner.*

U.S. Cl. X.R.

351—168, 176